(12) United States Patent
Wang et al.

(10) Patent No.: US 12,573,108 B2
(45) Date of Patent: Mar. 10, 2026

(54) HEAD-POSE AND GAZE REDIRECTION

(71) Applicant: QUALCOMM Incorporated, San Diego, CA (US)

(72) Inventors: Zhen Wang, San Diego, CA (US); Shiwei Jin, San Diego, CA (US); Lei Wang, San Diego, CA (US); Ning Bi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 181 days.

(21) Appl. No.: 18/295,741

(22) Filed: Apr. 4, 2023

(65) Prior Publication Data

US 2024/0338868 A1     Oct. 10, 2024

(51) Int. Cl.

| | |
|---|---|
| *G06T 11/60* | (2006.01) |
| *G06F 3/01* | (2006.01) |
| *G06T 3/60* | (2024.01) |
| *G06T 7/70* | (2017.01) |
| *G06T 9/00* | (2006.01) |
| *G06V 10/44* | (2022.01) |
| *G06V 10/82* | (2022.01) |

(52) U.S. Cl.
CPC ............. *G06T 11/60* (2013.01); *G06F 3/013* (2013.01); *G06T 3/60* (2013.01); *G06T 7/70* (2017.01); *G06T 9/00* (2013.01); *G06V 10/44* (2022.01); *G06V 10/82* (2022.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 2021/0065418 A1* | 3/2021 | Han | | G06T 11/60 |
| 2022/0050521 A1* | 2/2022 | Drozdov | | G06V 40/193 |
| 2022/0237829 A1* | 7/2022 | Ren | | G06T 7/73 |
| 2023/0154088 A1* | 5/2023 | Duarte | | G06T 5/50 |
| | | | | 345/473 |
| 2023/0254448 A1* | 8/2023 | Binder | | H04L 51/10 |
| | | | | 348/14.08 |

OTHER PUBLICATIONS

Ganin Y., et al., "DeepWarp: Photorealistic Image Resynthesis for Gaze Manipulation", Sep. 17, 2016, Topics in Cryptology—CT-RSA 2020, The Cryptographers Track at the RSA Conference 2020, San Francisco, CA, USA, Feb. 24-28, 2020, Springer, 201 Olin Library Cornell University Ithaca, NY 14853, pp. 311-326, XP047565770, Abstract p. 313, Last Paragraph—p. 314, Paragraph 1 Figure 2,16 Pages.

(Continued)

*Primary Examiner* — Yanna Wu

(74) *Attorney, Agent, or Firm* — Polsinelli LLP/QUALCOMM INCORPORATED

(57) ABSTRACT

Systems and techniques are described herein for generating an image. For instance, a method for generating an image is provided. The method may include obtaining a source image of a face having source attributes and exhibiting a source pose and source gaze; obtaining at least one of a target pose and a target gaze; and generating a modified image of the face having the source attributes and exhibiting at least one of the target pose and the target gaze.

26 Claims, 11 Drawing Sheets

(56) References Cited

OTHER PUBLICATIONS

International Search Report and Written Opinion—PCT/US2024/012649—ISA/EPO—May 14, 2024.

Jindal S., et al., "CUDA-GHR: Controllable Unsupervised Domain Adaptation for Gaze and Head Redirection", 2023 IEEE/CVF Winter Conference on Applications of Computer Vision (WACV), IEEE, Jan. 2, 2023, XP034291204, Abstract, p. 469, col. 1, Section 3-p. 470, col. 1, Paragraph 2, p. 472, col. 1, Section 4.4, p. 474, col. 2, Section 5, pp. 467-477.

Zheng Y., et al., "Self-Learning Transformations for Improving Gaze and Head Redirection", arXiv:2010.12307v1 [cs.Cv], arxiv.org, Cornell University Library, 201 Olin Library Cornell University Ithaca, NY, 14853, Oct. 23, 2020, XP081796174, Abstract p. 2, Paragraph 1 p. 3, Paragraph 1-Paragraph 2 p. 4, Section 3.2 p. 473, col. 1, Paragraph 2 Figures 2,3, 21 Pages.

* cited by examiner

800

Obtain a Source Image of a Face Having
Source Attributes and Exhibiting a Source Pose
and Source Gaze
802

Obtain One or Both of a Target Pose and a
Target Gaze
804

Generate a Modified Image of the Face Having
the Source Attributes and Exhibiting One or
Both of the Target Pose and the Target Gaze
806

FIG. 9

HEAD-POSE AND GAZE REDIRECTION

TECHNICAL FIELD

The present disclosure generally relates to head-pose and gaze redirection. According to some aspects, the present disclosure relates to modifying an image of a person by, for example, redirecting one or both of a head pose or a gaze of the person in the image.

BACKGROUND

Images of people, such as images of faces of people, can be useful for a variety of purposes. For example, images of people can be used for generating portraits, conducting videoconferencing, participating in extended reality (XR) applications, participating in video gaming applications, and/or other uses. In some cases, images of people are digital and can be analyzed and/or altered digitally.

Some techniques can perform pixel-level alterations of images of faces to generate modified images of the faces. For example, a technique may obtain an image of a face, where the face is not pointed at a camera which captured the image. The technique may perform pixel-level modifications to the image (e.g., warping) to generate a modified image which simulates an image in which the face is pointed into a camera.

BRIEF SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for generating an image. According to at least one example, a method is provided for generating an image. The method includes: obtaining a source image of a face having source attributes and exhibiting a source pose and source gaze; obtaining at least one of a target pose and a target gaze; and generating a modified image of the face having the source attributes and exhibiting at least one of the target pose and the target gaze.

In another example, an apparatus for generating an image is provided that includes at least one memory and at least one processor (e.g., configured in circuitry) coupled to the at least one memory. The at least one processor configured to: obtain a source image of a face having source attributes and exhibiting a source pose and source gaze; obtain at least one of a target pose and a target gaze; and generate a modified image of the face having the source attributes and exhibiting at least one of the target pose and the target gaze.

In another example, a non-transitory computer-readable medium is provided that has stored thereon instructions that, when executed by one or more processors, cause the one or more processors to: obtain a source image of a face having source attributes and exhibiting a source pose and source gaze; obtain at least one of a target pose and a target gaze; and generate a modified image of the face having the source attributes and exhibiting at least one of the target pose and the target gaze In another example, an apparatus for generating an image is provided. The apparatus includes: means for obtaining a source image of a face having source attributes and exhibiting a source pose and source gaze; means for obtaining at least one of a target pose and a target gaze; and means for generating a modified image of the face having the source attributes and exhibiting at least one of the target pose and the target gaze.

In some aspects, one or more of the apparatuses described herein is, can be part of, or can include a mobile device (e.g., a mobile telephone or so-called "smart phone", a tablet computer, or other type of mobile device), an extended reality device (e.g., a virtual reality (VR) device, an augmented reality (AR) device, or a mixed reality (MR) device), a vehicle (or a computing device or system of a vehicle), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 9 illustrates an example of a deep learning neural network that can be used to implement a perception module and/or one or more validation modules, according to some aspects of the disclosed technology;

DETAILED DESCRIPTION

Figure 1:
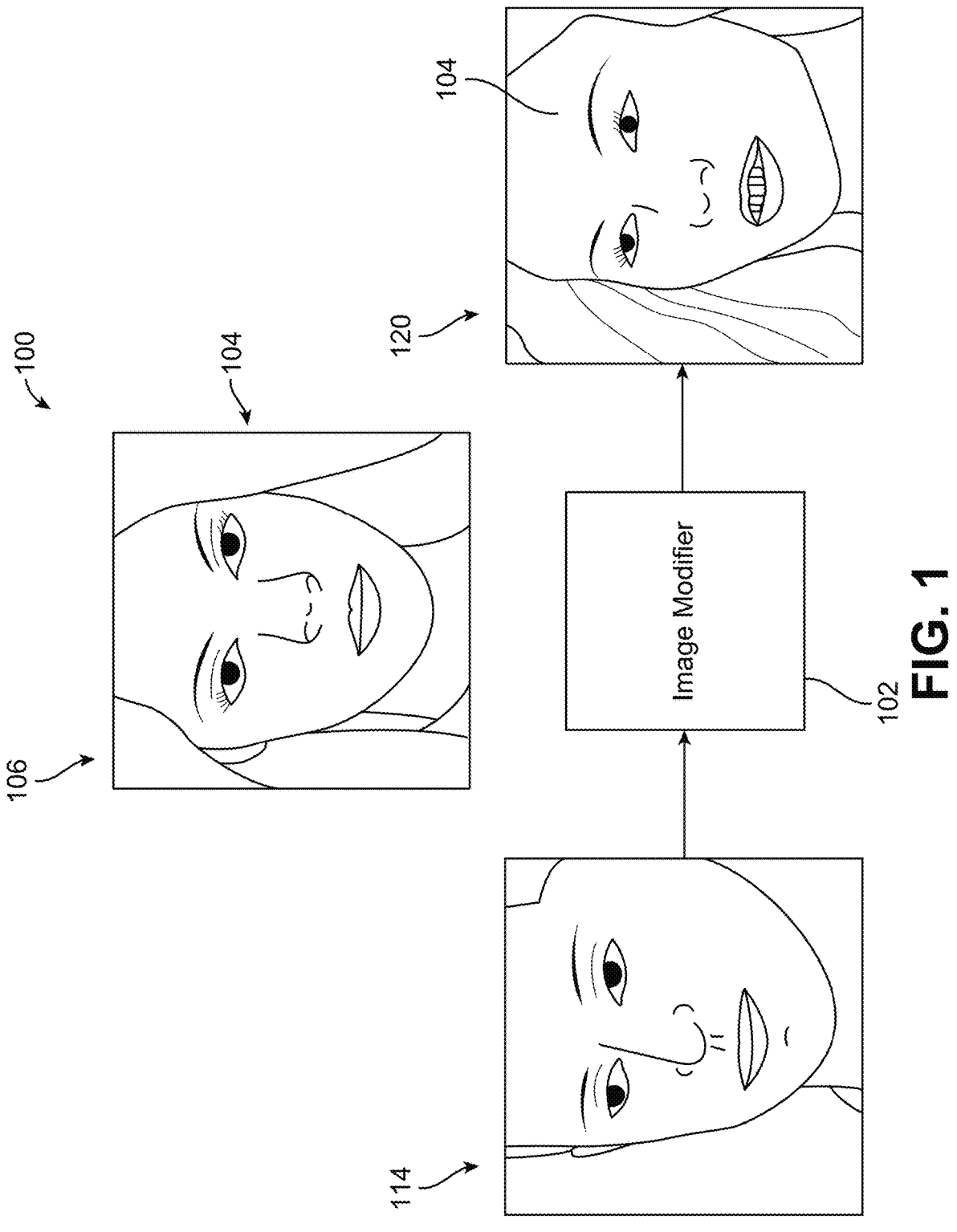
FIG. 1 is a block diagram illustrating a system for generating a modified image, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application.

However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

As mentioned previously, some existing techniques may perform pixel-level alterations of images of faces to generate modified images of the faces. However, such techniques may be focused on generating modified images that simulate the faces being directed into respective cameras (and not in arbitrary directions). Further, such techniques may be based on pixel-level modifications to the original image (e.g., stretching some regions of pixels, compressing some regions of pixels, copying and transposing some regions of pixels, etc.).

Existing techniques may not accurately or convincingly account for differing poses (e.g., pitch and yaw of a person's head relative to a camera which captured the image). For example, pixel-level alterations of an image of a nose captured from just above the nose may not be able to convincingly render an image of the nose captured from just below the nose. Additionally, or alternatively, existing techniques may not accurately or convincingly account for differing gazes (e.g., pitch and yaw of a person's eyes relative to the camera).

Systems, apparatuses, methods (also referred to as processes), and computer-readable media (collectively referred to herein as "systems and techniques") are described herein for redirecting one or both of a pose or a gaze of an object in an image of the object. In some aspects, the systems and techniques can redirect one or both of a head pose or a gaze of a face of a person in an image of the person. For example, the systems and techniques described herein may obtain an image of a face, obtain a target head pose and/or target gaze, and generate a modified image of the face, the face exhibiting (in the modified image) the target head pose and/or the target gaze. While faces of a person are used herein as examples of objects, the systems and techniques can be used to redirect poses and/or gazes of other objects.

In some cases, the systems and techniques may obtain a source image of a face of a person. The face may have attributes and may exhibit a source head pose and a source gaze. The attributes may reflect an identity of the person. For instance, the attributes may include, for example, shapes and/or colors of eyes, eyebrows, nose, nostrils, lips, chin, jaw, cheeks, forehead, ears, hair, facial hair, any combination thereof, and/or other portions of the face and/or head. The systems and techniques may also obtain a target head pose and/or a target gaze. The systems and techniques may generate a modified image of the face having the same attributes as those of the face in the source image, but the face (including the attributes of the face) may be modified to exhibit the target head pose and/or the target gaze in the modified image.

The target head pose and/or target gaze may be obtained as respective pairs of pitch and yaw angles (e.g., a pitch and yaw for the target head pose and a pitch and yaw for the target gaze). The target head pose and/or the target gaze may, or may not, be directed into the camera. The target head pose and/or the target gaze may be in arbitrary respective directions. In some cases, a target head pose and/or target gaze may be directly provided (e.g., as pitch and yaw angles). In other cases, a target image may be provided, and the target head pose and target gaze may be extracted from the target image. For instance, a machine-learning encoder may be trained to determine the target head pose and/or target gaze from an image (e.g., the target image). The machine-learning encoder may be, or may include, a multi-level attribute encoder.

In some aspects, the systems and techniques may use one or more trained machine-learning models to generate the modified image. For example, the systems and techniques may use a first machine-learning model (e.g., a multi-level attribute encoder) to encode the source image into a number of source features (e.g., feature vectors). The source features may include attribute features (e.g., implicitly representative of one or more attributes of a face represented by the image), a pose feature (e.g., implicitly representative of a source head pose of the face), and a gaze feature (e.g., implicitly representative of a source gaze of the face). One or more of the source features may be based on a neural network of the multi-level attribute encoder. For example, the source features may be outputs of one or more layers of the neural network.

In some cases, the systems and techniques may obtain or derive a pose-normalization matrix and/or a gaze-normalization matrix based, at least in part, on the source head pose and/or the source gaze. The systems and techniques may apply the pose-normalization matrix and/or the gaze-normalization matrix to the pose feature and/or the gaze feature respectively to normalize the pose and/or gaze of the source image. In this context, "normalize" may include orienting the face and/or eyes of the image to be directed to a reference point, such as in a direction toward the camera (e.g., a direction aligned with a center point of the camera). In cases in which the reference point is aligned with a center point of the camera, the normalized head pose may include yaw, pitch, and roll angles that are all zero. In cases in which the reference point is aligned with a center point of the camera, the normalized gaze may include yaw, pitch, and roll angles that are all zero.

In some examples, the systems and techniques may obtain or derive a target-pose rotation matrix and/or a target-gaze rotation matrix based on the target head pose and/or the target gaze. The target-pose rotation matrix and/or target-gaze rotation matrix may be used to rotate a head pose and/or a gaze that is initially directed to the reference point (e.g., the reference point to which the pose-normalization matrix and the gaze-normalization matrix oriented the face and/or eyes) to be directed as the target head pose and/or target gaze are respectively directed. The systems and techniques may apply the target-pose rotation matrix to the normalized pose feature to generate a modified pose feature implicitly representing the pose of the head of the image oriented to match the target head pose. The systems and techniques may apply the target-gaze rotation matrix to the normalized gaze feature to generate a modified gaze feature implicitly representing the eyes of the image oriented to match the target gaze.

In some cases, the systems and techniques may generate a modified image using a second machine-learning model (e.g., a decoder and/or, or including, one or more multi-channel adaptive attentional denormalization residual blocks) based on the modified features. For example, the systems and techniques may use the second machine-learning model (e.g., a deconvolutional neural network) to decode the attribute features, the modified pose feature, and the modified gaze feature into a modified image.

The systems and techniques may modify images of faces to reorient faces and/or eyes toward an arbitrary direction and not only into a camera used to capture. Further, the modified images may be more convincing than other images because the modified images may not rely on pixel-level alterations but instead use machine-learning models trained on many images of many faces.

The systems and techniques may be used for a variety of purposes including, as examples, generating images of faces for portraits, conducting videoconferencing, participating in extended reality (XR) applications, participating in video gaming applications, use as training data for other machine-learning models and/or other uses. As an example, systems and techniques may be used to redirect a face of a person in a video chat. For example, the systems and techniques may be used to direct images of the face of the person toward the camera, even when the person is not facing toward the camera which captured the images.

Various aspects of the application will be described with respect to the figures.

FIG. 1 is a block diagram illustrating a system 100 for generating a modified image 120, according to various aspects of the present disclosure. System 100 includes an image modifier 102, which may obtain a source image 106 of a face 104 of a person and generate modified image 120 of face 104 exhibiting a target gaze and a target head pose.

The source image 106 represents the face 104 of the person. The source image 106 (or face 104) may have source attributes. The source attributes may include, for example, shapes and/or colors of eyes, eyebrows, nose, nostrils, lips, chin, jaw, cheeks, forehead, ears, hair, facial hair, any combination thereof, and/or other portions of face 104 and/or of head. As noted previously, the attributes may reflect an identity of the person in source image 106. Further, the face 104 in the source image 106 may exhibit a source head pose and a source gaze. Source head pose of the person in source image 106 may be represented as a pitch angle and a yaw angle indicative of a direction in which face 104 is directed, with respect to a camera which captured source image 106. Source gaze of the person in source image 106 may be represented as a pitch angle and a yaw angle indicative of a direction in which eyes of face 104 are directed, with respect to a camera which captured source image 106.

Image modifier 102 may obtain the target head pose and the target gaze. For example, in some cases, image modifier 102 may receive target head pose and/or target gaze as respective pitch and yaw angles. In other cases, image modifier 102 may receive a target image 114 and extract the target head pose and the target gaze from the target image 114. For example, image modifier 102 may include a machine-learning encoder (e.g., a multi-level attribute encoder) trained to determine target head pose and/or target gaze from an image (e.g., target image 114).

Target head pose may be represented as a pitch angle and a yaw angle indicative of a direction in which face 104 is to be directed in modified image 120, with respect to a point of view from which face 104 is viewed in modified image 120. For example, target head pose may include a yaw angle of 15-30 degrees left and a pitch angle of 0 degrees. Target gaze may be represented as a pitch angle and a yaw angle indicative of a direction in which eyes face 104 are to be directed in modified image 120, with respect to a point of view from which face 104 is viewed in modified image 120. For example, target gaze may include a yaw angle of 15-30 degrees left and a pitch angle of 0 degrees.

Image modifier 102 may encode source image 106 (or face 104 of source image 106) into a plurality of features. Image modifier 102 may include a machine-learning model (e.g., a multi-level attribute encoder) that may encode the source image 106 into a number of source features (e.g., feature vectors). The source features may include attribute features (e.g., implicitly representative of the source attributes), a pose feature (e.g., implicitly representative of the source head pose of the source image 106), and a gaze feature (e.g., implicitly representative of the source gaze of the source image 106). One or more of the source features may be based on a neural network (e.g., a convolutional neural network or a U-Net-based encoder) of the machine-learning model. For example, the source features may be outputs of one or more layers of the neural network.

Additionally, image modifier 102 may modify at least some of the source features based on target head pose and/or target gaze. For example, image modifier 102 may obtain (or determine) a pose-normalization matrix, a gaze-normalization matrix, a target-pose rotation matrix, and a target-gaze rotation matrix based on the source head pose of the source image 106, the source gaze of the source image 106, the target head pose, and the target gaze.

Image modifier 102 may apply the pose-normalization matrix to at least some of the source features of source image 106. For example, image modifier 102 may apply the pose-normalization matrix to the pose feature to generate a normalized pose feature. Further, image modifier 102 may apply the target-pose rotation matrix to the normalized pose feature to generate a rotated pose feature.

Additionally, image modifier 102 may apply the gaze-normalization matrix to at least some of the source features of source image 106. For example, image modifier 102 may apply the gaze-normalization matrix to the gaze feature to generate a normalized gaze feature. Further, image modifier 102 may apply the target-gaze rotation matrix to the normalized gaze feature to generate a rotated gaze feature.

Image modifier 102 may combine and/or decode the attribute features of the source features of source image 106, the rotated pose feature, and the rotated gaze feature to generate modified features. Image modifier 102 may generate modified image 120 using the modified features. For example, image modifier 102 may generate modified image 120 using multi-channel adaptive attentional denormalization residual blocks based on the modified features.

Figure 2:
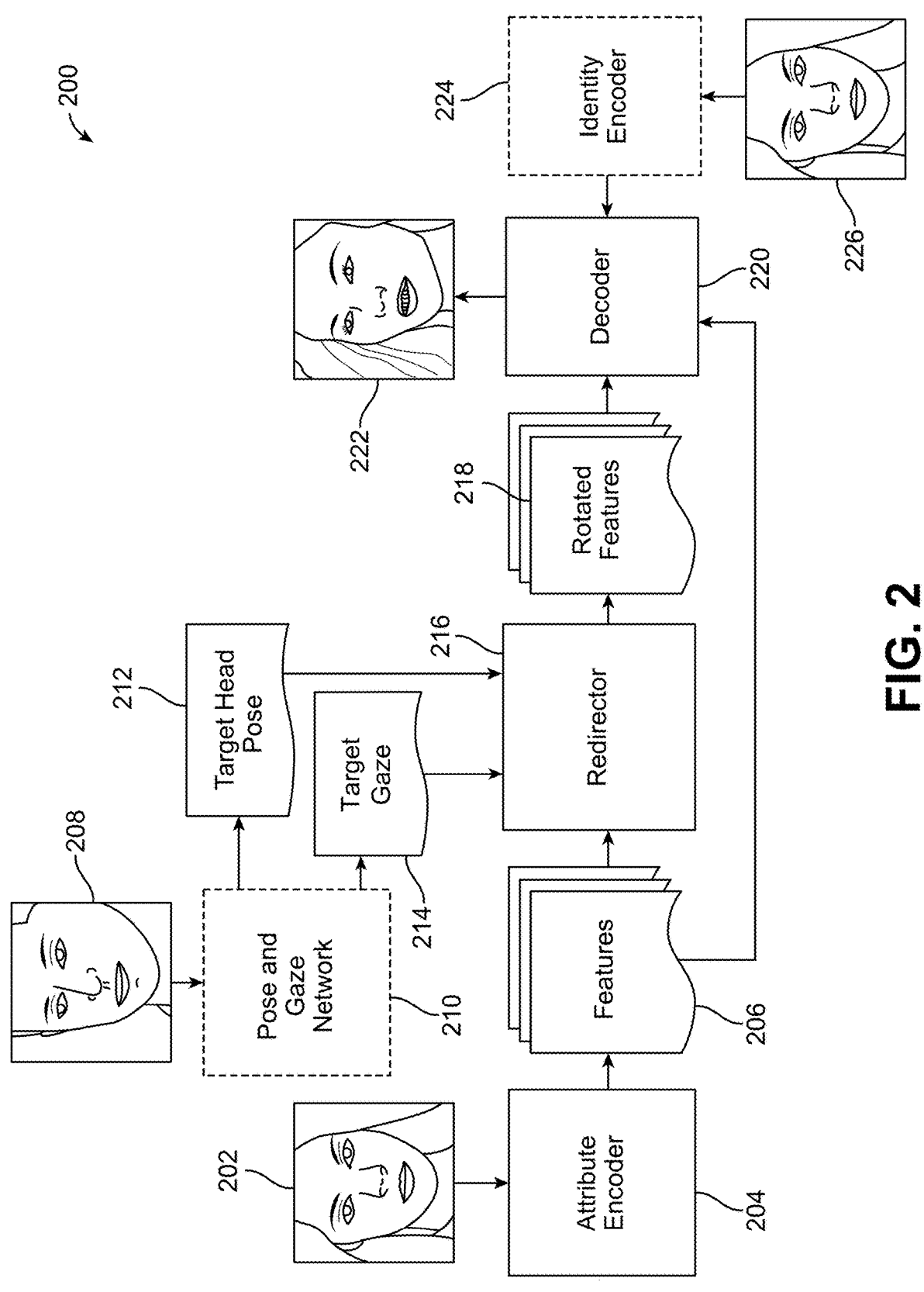
FIG. 2 is a block diagram illustrating another system for generating a modified image, according to various aspects of the present disclosure.

FIG. 2 is a block diagram illustrating a system 200 for generating a modified image 222, according to various aspects of the present disclosure. System 200 may obtain source image 202 of a face of a person and generate modified image 222 of the face exhibiting a target gaze and a target head pose. System 200 may be the same as, substantially similar to, or perform the same, or substantially the same, operations as system 100 of FIG. 1.

Source image 202 may represent face of a person. The source image 202 (or the face of source image 202) may have source attributes (such as, for example, the source attributes 108 of source image 106 of FIG. 1). Further, the face may exhibit a source head pose and a source gaze (such as, for example, the source head pose and the source gaze of the source image 106 of FIG. 1).

Attribute encoder 204 may obtain source image 202 and encode the source attributes of source image 202 as features 206. Features 206 may include attribute features (e.g., implicitly representative of the source attributes of source image 202), a pose feature (e.g., implicitly representative of the source head pose), and a gaze feature (e.g., implicitly representative of the source gaze). Attribute encoder 204 may be, or may include, a machine-learning model (e.g., a multi-level attribute encoder) that may encode source image 202 into features 206. Features 206 may be based on a neural network (e.g., a convolutional neural network or a U-Net-based encoder) of the machine-learning model. For example, the source features may be outputs of one or more layers of the neural network. In some cases, the source features may include one or more feature vectors.

Redirector 216 may obtain features 206, target head pose 212, and target gaze 214. Target head pose 212 may be the same as, or substantially similar to target head pose of FIG. 1 and target gaze 214 may be the same as, or substantially similar to target gaze of FIG. 1. In some cases, system 200 may receive target head pose 212 as respective pitch and yaw angles. In other cases, system 200 may receive a target image 208 and extract target head pose 212 and target gaze 214 from target image 208. For example, in some cases, system 200 may include a pose and gaze network 210, which may be, or may include a machine-learning encoder (e.g., a multi-level attribute encoder) trained to determine target head pose 212 and target gaze 214 from an image (e.g., target image 208). Pose and gaze network 210 is optional in system 200. The optional nature of pose and gaze network 210 in system 200 is indicated by pose and gaze network 210 being illustrated in dashed lines in FIG. 2.

Additionally, redirector 216 may redirect features 206 (specifically the pose feature and the gaze feature of features 206) based on target head pose 212 and a target gaze 214. Redirector 216 may obtain a source head pose and a source gaze (e.g., from attribute encoder 204 and/or based on the pose feature and the gaze feature of features 206). Redirector 216 may determine a pose-normalization matrix based on the source head pose. The pose-normalization matrix may be used to redirect the source head pose to a pose reference point. The pose reference point may be, as an example, a pitch angle of 0 degrees and a yaw angle of 0 degrees (e.g., directed toward a viewing angle). The pose-normalization matrix may be, for example:

$$R = \begin{bmatrix} 1 & 0 & 0 \\ 0 & \cos\theta & -\sin\theta \\ 0 & \sin\theta & \cos\theta \end{bmatrix} \begin{bmatrix} \cos\phi & 0 & \sin\phi \\ 0 & 1 & 0 \\ -\sin\phi & 0 & \cos\phi \end{bmatrix} \qquad (1)$$

Where $\theta$ may be a yaw angle toward the pose reference point and $\phi$ may be a pitch angle toward the pose reference point.

Further, redirector 216 may generate a gaze-normalization matrix based on the source gaze. The gaze-normalization matrix may be used to redirect the source gaze to a gaze reference point (which may or may not be the same as the pose reference point). The gaze reference point may be, as an example, a pitch angle of 0 degrees and a yaw angle of 0 degrees (e.g., directed toward a viewing angle). The gaze-normalization matrix may be defined by equation (1) where $\theta$ may be a yaw angle toward the gaze reference point and $\phi$ may be a pitch angle toward the gaze reference point.

Additionally, redirector 216 may generate a target-pose rotation matrix based on target head pose 212 and the pose reference point. The target-pose rotation matrix may be used to redirect a pose directed to the pose reference point to match the target head pose 212. The target-pose rotation matrix may be defined by equation (1) where $\theta$ may be a yaw angle of target head pose 212 and $\phi$ may be a pitch angle of target head pose 212.

Similarly, redirector 216 may generate a target-gaze rotation matrix based on target gaze 214 and of the gaze reference point. The target-gaze rotation matrix may be used to redirect a gaze directed to the gaze reference point to match the target gaze 214. The target-gaze rotation matrix may be defined by equation (1) where $\theta$ may be a yaw angle of target gaze 214 and $\phi$ may be a pitch angle of target gaze 214.

Redirector 216 may apply the pose-normalization matrix to the pose feature to generate a normalized pose feature. Further, redirector 216 may apply the target-pose rotation matrix to the normalized pose feature to generate a rotated pose feature. Additionally, redirector 216 may apply the gaze-normalization matrix to the gaze feature to generate a normalized gaze feature. Further, redirector 216 may apply the target-gaze rotation matrix to the normalized gaze feature to generate a rotated gaze feature. The rotated pose feature and the rotated gaze feature may be included in rotated features 218. Decoder 220 may be, or may include, a multi-channel adaptive attentional denormalization (MAC-AAD) decoder. Decoder 220 may obtain attribute features of features 206, the rotated pose feature of rotated features 218, and the rotated gaze feature of rotated features 218. Decoder 220 may combine and/or decode the attribute features, the rotated pose feature, and the rotated gaze feature to generate modified features. Decoder 220 may generate modified image 222 using the modified features. For example, decoder 220 may generate modified image 222 using multi-channel adaptive attentional denormalization residual blocks based on the modified features.

Additionally, or alternatively, in some cases, system 200 may include an identity encoder 224. Identity encoder 224 may obtain source image 226 and may generate identity features implicitly representative of an identity of a person whose face is represented in source image 226. Identity encoder 224 may provide the identity features to decoder 220 and decoder 220 may generate modified image 222 using the identity features in addition to the attribute features, the rotated pose feature and the rotated gaze feature. Identity encoder 224 is optional in system 200. The optional nature of identity encoder 224 in system 200 is indicated by identity encoder 224 being illustrated in dashed lines in FIG. 2. Source image 226 may, or may not, be the same as source image 202. Additionally, the person whose face is represented in source image 226 may, or may not, be the same person whose face is represented in source image 202. In cases in which source image 226 is the same as source image 202 (or cases in which the same person is represented in source image 202 and in source image 226), providing the identity features from identity encoder 224 to decoder 220 may reinforce the identity of the person in modified image 222. In cases in which a different person is represented in source image 202 than is represented in source image 226, providing the identity features from identity encoder 224 to decoder 220 may change the identity of the person in modified image 222 to be the identity of the person represented in source image 226.

Figure 3:
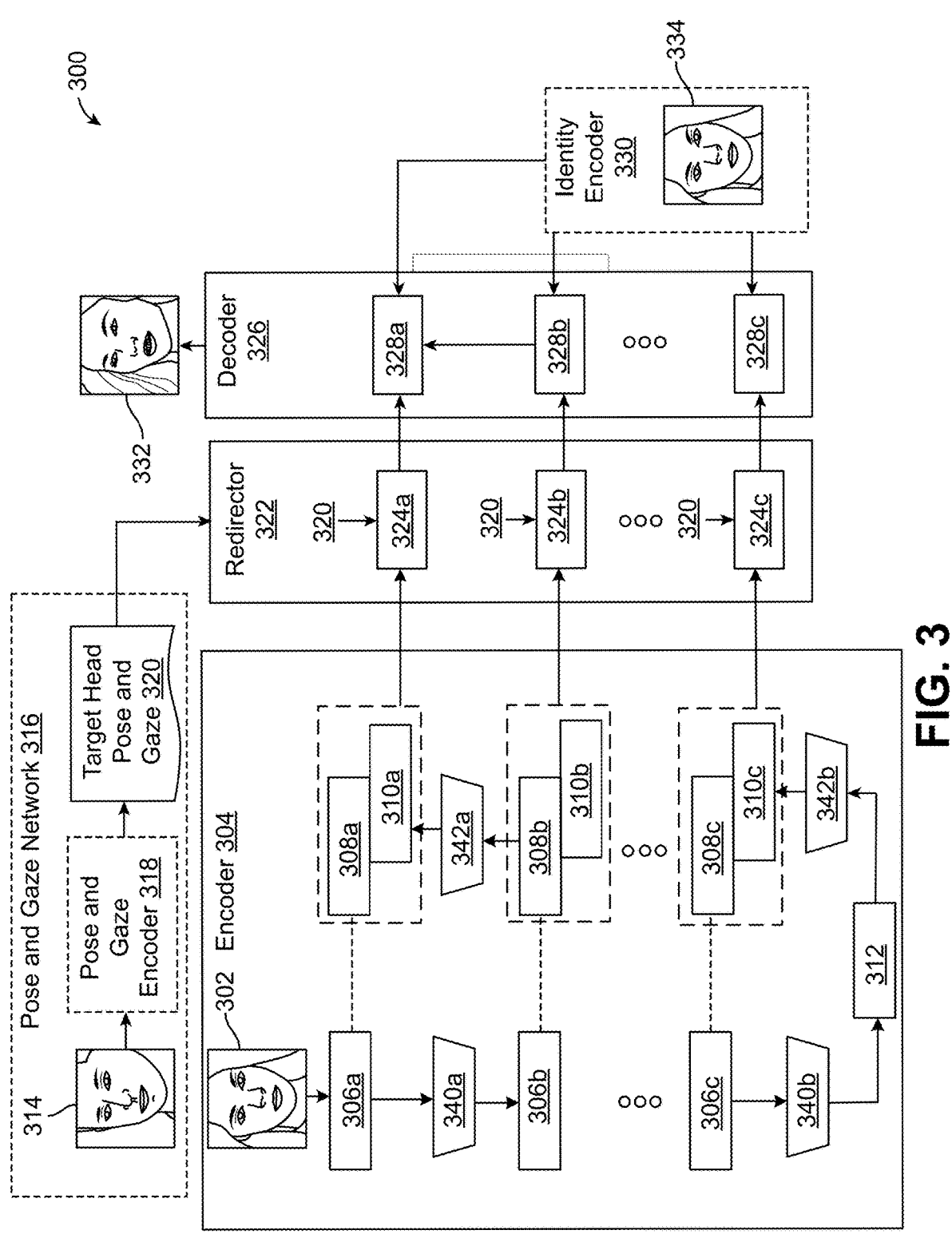
FIG. 3 is a block diagram illustrating yet another system for generating a modified image, according to various aspects of the present disclosure.

FIG. 3 is a block diagram illustrating a system 300 for generating a modified image 332, according to various aspects of the present disclosure. System 300 may obtain source image 302 of a face of a person and generate modified image 332 of the face exhibiting a target head pose and gaze 320. System 300 may be the same as, substantially similar to, or perform the same, or substantially the same, operations as system 100 of FIG. 1 and/or system 200 of FIG. 2.

Source image 302 may represent face of a person; source image 302 (or the face of source image 302) may have source attributes (such as, for example, the source attributes 108 of source image 106 of FIG. 1). Further, the face may exhibit a source head pose and a source gaze (such as, for example, the source head pose and the source gaze of the source image 106 of FIG. 1).

Encoder 304 may be the same as, substantially similar to, or perform the same, or substantially the same, operations as attribute encoder 204 of FIG. 2. However, in FIG. 3, features 306a, 306b, through 306c (referred to herein collectively as features 306), features 308a, 308b, through 308c (referred to herein collectively as features 308), outputs 310a, 310b, through 310c (referred to herein collectively as outputs 310), convolutional layers 340a through convolutional layer 340b (referred to herein collectively as convolutional layers 340), and transpose and/or upsampling convolutional layers 342a through 342b (referred to herein collectively as upsampling convolutional layers 342) are illustrated. While three features 306 are illustrated in FIG. 3 for illustrative purposes, encoder 304 may include any number of features 306. While two convolutional layers 340 are illustrated (between feature 306a and feature 306b and between feature 306c and transpose convolutional feature 312) for illustrative purposes, encoder 304 may include any number of convolutional layers 340 (e.g., one convolutional layer 340 between each of features 306). Similarly, while three features 308 are illustrated in FIG. 3 for illustrative purposes, encoder 304 may include any number of features 308 (e.g., one feature 308 for each feature 306). Each of features 308 may be a copy of a respective one of features 306. While three outputs 310 are illustrated in FIG. 3 for illustrative purposes, encoder 304 may include any number of outputs 310. Outputs 310 may be outputs of upsampling convolutional layers 342. While two upsampling convolutional layers 342 are illustrated (between transpose convolutional feature 312 and output 310c and between feature 308b and output 310a) for illustrative purposes, encoder 304 may include any number of upsampling convolutional layers 342 (e.g., one upsampling convolutional layer 342 between each pair of features 308 and outputs 310).

Encoder 304 may have a U-net structure. Features 306 may be connected, one to another, by convolutional layers 340 (which may be 3×3 convolutional layers). For example, 340a may be between feature 306a and feature 306b and another convolutional layer (not illustrated in FIG. 4) may be between feature 306b and feature 306c. Each of features 308 may be skip-connected to a respective one of features 306. The skip connection between features 306 and features 308 may mean that each of features 308 may be a copy of a respective one of features 306. The correspondence between features 306 and features 308 is represented by a dashed line. For example, feature 308a may be identical to feature 306a. By stacking feature 308c and output 310c and applying upsampling convolutional layer (not illustrated in FIG. 3), output 310b is obtained. By stacking output 310b and feature 308b and applying upsampling convolutional layer 342b, output 310a is obtained. In some cases, a further output 310 may be obtained by stacking output 310a and feature 308a and applying another upsampling convolutional layer (not illustrated in FIG. 3).

Encoder 304 may obtain source image 302 and encode the source attributes of source image 302 as features 308 and outputs 310. Features 308 and outputs 310 may include attribute features (e.g., implicitly representative of the source attributes of source image 302), a pose feature (e.g., implicitly representative of the source head pose), and a gaze feature (e.g., implicitly representative of the source gaze). Encoder 304 may be, or may include, a machine-learning model (e.g., a multi-level attribute encoder) that may encode source image 302 into features 308 and outputs 310. Features 308 and outputs 310 may be based on a neural network (e.g., a convolutional neural network or a U-Net-based encoder) of encoder 304.

System 300 may provide source image 302 to encoder 304 (which may be, or may include, a U-Net-based attribute encoder or a convolutional neural network) to extract features 308 and outputs 310 (which may be, or may include, multi-level features). According to some aspects, encoder 304 may include a transpose convolutional feature 312 (output of convolutional layer 340b and the input of layer convolutional 342b) at the end of the decoder. The use of the convolutional layer 340b to generate transpose convolutional feature 312 may allow system 300 to generate images with higher resolution than would be possible without generating transpose convolutional feature 312. The features 306 (which may be, or may represent, multi-level features) may be skip-connected with features 308 (which may be, or may represent, encoded features). Features 308 and outputs 310 may be fed into respective redirection blocks 324a, 324b, through 324c (referred to herein collectively as redirection blocks 324) of a redirector 322 at different levels.

System 300 may include a pose and gaze network 316, which pose and gaze network 316 may be the same as, substantially similar to, or perform the same, or substantially the same, operations as pose and gaze network 210 of FIG. 2. For example, pose and gaze network 316 may obtain a target image 314, and may use a pose and gaze encoder 318 to generate target head pose and gaze 320 (which may be the same as, or substantially similar to target head pose 212 and target gaze 214 of FIG. 2). Pose and gaze encoder 318 may be, or may include, an encoder (e.g., that has a VGG-16 structure) with 4 outputs (e.g., a yaw angle and a pitch angle of a head pose and yaw angle and a pitch angel of a gaze) corresponding to target head pose and gaze 320. Pose and gaze network 316, including pose and gaze encoder 318, is optional in system 300. The optional nature of pose and gaze network 316 and pose and gaze encoder 318 in system 300 are indicated by pose and gaze network 316 and pose and gaze encoder 318 being illustrated in dashed lines in FIG. 3. In cases where system 300 does not include pose and gaze network 316, system 300 may obtain target head pose and gaze 320 from another source (e.g., directly as respective pitch and yaw angles).

Redirector 322 may modify features 308 and outputs 310 (which may be implicitly representative of source attributes, a head pose and a gaze of source image 302) such that the modified features exhibit target head pose and gaze 320. Redirector 322 may be the same as, substantially similar to, or perform the same, or substantially the same, operations as redirector 216 of FIG. 2. However, in FIG. 3, redirection blocks 324 are illustrated at different levels (e.g., corresponding to features 306 and/or features 308). While redirector 322 is shown in FIG. 3 as including three redirection blocks 324 for illustrative purposes, redirector 322 may include any number of redirection blocks 324. According to some aspects, there may be one redirection block 324 in redirector 322 for each feature 308 and outputs 310 in encoder 304.

Redirector 322 may provide the modified features to decoder 326. Decoder 326 may generate modified image 332 having source attributes of source image 302 and exhibiting target head pose and gaze 320. Decoder 326 may be the same as, substantially similar to, or perform the same, or substantially the same, operations as decoder 220 of FIG. 2. However, in FIG. 3, decoder 326 is illustrated including decoder blocks 328a, 328b, through 328c (referred to herein collectively as decoder blocks 328) at different levels (e.g., corresponding to features 306, features 308, and/or redirection blocks 324). While decoder 326 is shown in FIG. 3 as including three decoder blocks 328 for illustrative purposes, decoder 326 may include any number of decoder blocks 328. According to some aspects, there may be one of decoder blocks 328 for each of redirection blocks 324.

According to some aspects, system 300 may include an identity encoder 330, which may be the same as, substantially similar to, or perform the same, or substantially the same, operations as identity encoder 224 of FIG. 2. Identity encoder 330 may obtain source image 334 and may generate identity features implicitly representative of an identity of a person whose face is represented in source image 334. Identity encoder 330 may provide the identity features to decoder 326 and decoder 326 may generate modified image 332 using the identity features in addition to the attribute features, the rotated pose feature and the rotated gaze feature. Identity encoder 330 is optional in system 300. The optional nature of identity encoder 330 in system 300 is indicated by identity encoder 330 being illustrated in dashed lines in FIG. 3. Source image 334 may, or may not, be the same as source image 302. Additionally, the person whose face is represented in source image 334 may, or may not, be the same person whose face is represented in source image 302. In cases in which source image 226 is the same as source image 302 (or cases in which the same person is represented in source image 302 and in source image 334), providing the identity features from identity encoder 330 to decoder 326 may reinforce the identity of the person in modified image 332. In cases in which a different person is represented in source image 302 than is represented in source image 334, providing the identity features from identity encoder 330 to decoder 326 may change the identity of the person in modified image 332 to be the identity of the person represented in source image 334.

Figure 4:
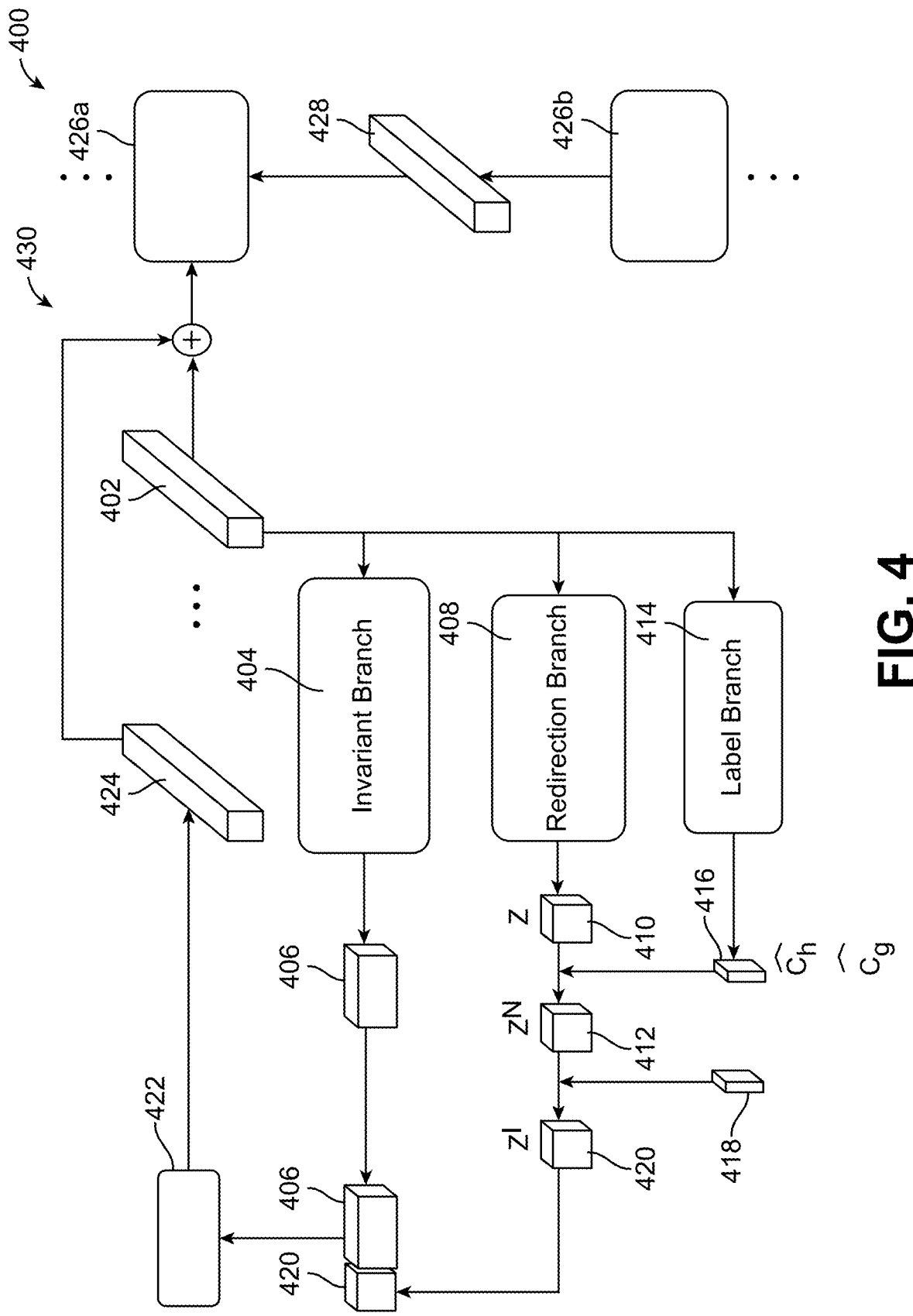
FIG. 4 is a block diagram illustrating one layer of a system for generating a modified image, according to various aspects of the present disclosure.

FIG. 4 is a block diagram illustrating one layer 430 (or level) of a system 400 for generating a modified image, according to various aspects of the present disclosure. Layer 430 may be an illustration of one layer (or level) of system 300 of FIG. 3.

Layer 430 may obtain (e.g., as an input) feature 402. Feature 402 may be the same as, or substantially similar to any stacked pair of a feature 308 and an output 310 of FIG. 3 (e.g., feature 308a and output 310a or feature 308b and output 310b). Feature 402 may be a tensor (e.g., with a size of 1024×4×4).

Additionally, layer 430 may separately extract attribute features 406 and pose and gaze features 410 from feature 402. For example, layer 430 may disentangle attribute features 406, which may be indicative of an identify of a person, and which are to remain invariant when generating a modified image of the person, from pose and gaze features 410, which may be modified to match a target head pose and a target gaze respectively. Loss functions are involved to ensure pose and gaze features 410 from redirection branch 408 include only head pose and gaze info. For example, as an encoded (e.g., encoder 304) is trained, a loss function will be used to train the encoder to separate pose and gaze features 410 from other features. The remaining features will be determined to be invariant features and will be processed in invariant branch 404.

Having disentangled attribute features 406 from pose and gaze features 410, layer 430 may handle attribute features 406 at an invariant branch 404. Invariant branch 404 may be, or may include, one or more fully-connected convolutional layers. Invariant branch 404 may transform feature 402, which may begin as an input tensor (e.g., with a size of 1024×4×4), into an invariant embedding (which may have a dimension is 1×256). The invariant embedding may convey source features (which may not be related to target attributes). The source features may include identity features and expression features. Since the source attributes should be invariant before and after transformation, the corresponding embeddings may be directly passed to decoder 422 branch without any modifications.

Layer 430 may handle pose and gaze features 410 at a redirection branch 408. Redirection branch 408 may be, or may include, one or more fully-connected convolutional layers. Redirection branch 408 may transform feature 402, which may begin as an input tensor (e.g., with a size of 1024×4×4), to embeddings $z_h$ and $z_g$ (which may each have a size of 3×16). Embeddings $z_h$ and $z_g$ may be, or may include, a source pose feature and a source gaze feature Layer 430 may handle label features at a label branch 414. Label branch 414 may be, or may include, one or more fully-connected convolutional layers. Label branch 414 may estimate source head pose $\widehat{C_h}$ and source gaze $\widehat{C_g}$.

At redirection branch 408, embeddings $z_h$ and $z_g$—may be normalized (e.g., to redirect them from their respective original directions to a pose reference point and a gaze reference point). Both estimated labels $\widehat{C_h}$ and $\widehat{C_g}$ may represented by respective pitch and yaw angles. At redirection branch 408, based on the source head pose $\widehat{C_h}$ and the source gaze $\widehat{C_g}$, layer 430 may obtain (or generate) normalization matrices 416. Normalization matrices 416 may include estimated labels shown based on Equation (1), where $\theta$ represents the pitch angle and $\phi$ represents the yaw angle. An inverse of normalization matrices 416 may be applied to embeddings $z_h$ and $z_g$ to acquire the normalized embeddings $z_h^N$ and $z_g^N$, respectively. These normalized embeddings $z_h^N$ and $z_h^N$ may not have any original head pose and gaze information anymore.

Additionally, rotation matrices may be generated based on the target head pose and gaze 418 from the target image. The rotation matrices may be applied to the normalized embeddings $z_h^N$ and $z_h^N$, to acquire the denormalized embeddings $z_h'$ and $z_h^N$ which contains the newly assigned target head pose and gaze 418 information.

Additionally, layer 430 may combine attribute features 406 and denormalized embeddings $z_h'$ and $z_g'$ (e.g., by concatenating attribute features 406 and redirected pose and gaze features 420). The concatenated tensor (including attribute features 406 and denormalized embeddings $z_h'$ and $z_g'$) may be fed into decoder 422. Decoder 422 may include several fully-connected layers for acquiring a tensor residual feature 424 (which may have a size of 1024×4×4, for example).

Layer 430 may combine feature 424 with feature 402 to achieve head pose and gaze redirection from the feature level. Layer 430 may provide feature 402 and feature 424 (e.g., as combined) to decoder block 426a. Decoder block 426a may be the same as, substantially similar to, or perform the same, or substantially the same, operations as any one of decoder blocks 328 of FIG. 3. Decoder block 426a may combine feature 424 and feature 402, as combined by layer 430 with feature 428 (which may be a combination of one or more features from one or more lower layers, including, as an example, decoder block 426b). Decoder block 426a may provide the result of the combination to one or more higher layers (not illustrated in FIG. 4).

Figure 5:
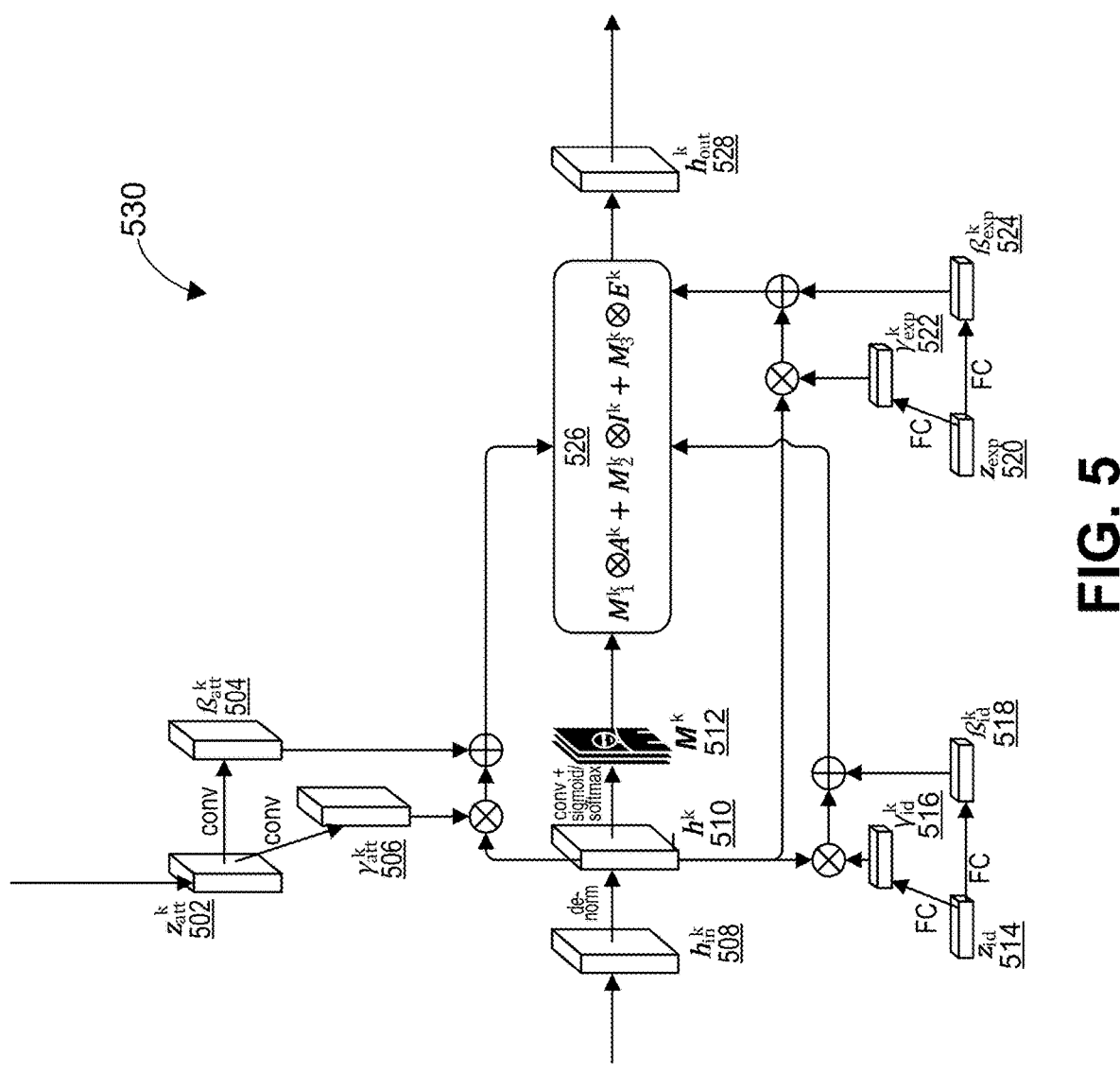
FIG. 5 is a block diagram illustrating one layer of a system for generating a modified image, according to various aspects of the present disclosure.

FIG. 5 illustrates an example architecture of a multi-channel adaptive attentional denormalization (MC-AAD) layer 530 of a system for generating a modified image, according to various aspects of the present disclosure. For instance, the MC-AAD layer 530 of FIG. 5 is an example illustration of one decoder block of the decoder blocks 328 of FIG. 3. The system of FIG. 5 includes the MC-AAD layer 530, various inputs to the MC-AAD layer 530, and an output of the MC-AAD layer 530. The inputs to the MC-AAD layer 530 include the input tensor $h_{in}^k$ 508, the attribute feature tensor $z_{att}^k(I_{att})$ 502, the identity feature tensor $z_{id}(I_{id})$ 514, and/or the expression feature tensor $z_{exp}(I_{exp})$ 520. The identity feature tensor $z_{id}(I_{id})$ 514 of FIG. 5 may be the same as, or substantially similar to any one of the identity features of identity encoder 330 of FIG. 3. The expression feature tensor $z_{exp}(I_{exp})$ 520 of FIG. 5 may implicitly represent an expression of a face of an image. Additional detail regarding tan expression feature is given with regard to FIG. 6. In some examples, the inputs to the MC-AAD layer 530 can also include a feature tensor corresponding to a feature 308 and output 310, and/or rotated features (e.g., as rotated by redirector 322 of FIG. 3) as described herein. The output of the MC-AAD layer 530 is the output tensor $h_{out}^k$ 528. Feature tensors can include feature vectors and/or feature matrices.

In some examples, the input tensor $h_{in}^k$ 508 can include an output of a previous MC-AAD layer and/or a previous MC-AAD residual block. In some examples, the input tensor $h_{in}^k$ 508 can include identity feature tensor $z_{id}(I_{id})$ 514, the expression feature tensor $z_{exp}(I_{exp})$ 520, a feature tensor corresponding to the features $z_{x_i}(I_{x_i})$, or a combination thereof.

The MC-AAD layer 530 is configured to, and can, integrate the attribute feature tensor $z_{att}^k(I_{att})$ 502 with other feature tensors $z_{x_i}(I_{x_i})$ from the pre-trained encoders, such as the identity feature tensor $z_{id}(I_{id})$ 514, the expression feature tensor $z_{exp}(I_{exp})$ 520, the feature tensor $z_{x_i}(I_{x_i})$ corresponding to the features $z_{x_i}(I_{x_i})$, or a combination thereof. The attribute feature tensor $z_{att}^k(I_{att})$ 502 is a 3-D attribute feature tensor extracted from a source image $I_{att}$(e.g., source image 302 of FIG. 3) using a multi-level attribute encoder $z_{att}^k(\bullet)$ (e.g., encoder 304 of FIG. 3), and provides feature information for attributes that are to be maintained at $k^{th}$ scale. For each value of i, where $x_i \in x$, $z_{x_i}(I_{x_i})$, is a 1-dimensional (1-D) feature tensor (e.g., feature vector) extracted from a source image $I_{x_i}$ and provides information about the attributes that are to be changed in a modified image (e.g., modified image 332 of FIG. 3) and/or in the attribute feature tensor $z_{att}^k(I_{att})$ 502. Examples of $z_{x_i}(I_{x_i})$ include the identity feature tensor $z_{id}(I_{id})$ 514 and the expression feature tensor $z_{exp}(I_{exp})$ 520.

The MC-AAD layer 530 is at the $k^{th}$ scale or level along a range from 1 to n. The MC-AAD layer 530 receives the input tensor $h_{in}^k$ 508. The dimensions of the input tensor $h_{in}^k$ n508 are denoted as $C^k \times H^k \times W^k$.

The MC-AAD layer 530 performs denormalization is performed on the input tensor $h_{in}^k$ 508 to obtain the denormalized input tensor $\bar{h}^k$ 510, by calculating:

$$\bar{h}^k = \left(h_{in}^k - \mu^k\right)/\sigma^k$$

Here, $\mu^k \in \mathbb{R}^{C^k \times 1 \times 1}$ is the mean, and $\sigma^k \in \mathbb{R}^{C^k \times 1 \times 1}$ is the standard deviation of the input tensor $h_{in}^k$ 508 computed along image width and height dimensions.

The MC-AAD layer 530 is configured to, and can, generate feature maps based on the attribute feature tensor $z_{att}^k(I_{att})$ 502, the identity feature tensor $z_{id}(I_{id})$ 514, and the expression feature tensor $z_{exp}(I_{exp})$ 520. The MC-AAD layer 530 performs two convolutions using the attribute feature tensor $z_{att}^k(I_{att})$ 502 to generate feature map $\beta att$ 504 and feature map $\gamma_{att}^k$ 506. The MC-AAD layer 530 performs convolutions using fully connected (FC) convolutional layers using the identity feature tensor $z_{id}(I_{id})$ 514 to generate feature map $\beta_{id}^k$ 518 and feature map $\gamma_{id}^k$ 516. The MC-AAD layer 530 performs convolutions using fully connected (FC) convolutional layers using the identity feature tensor $z_{exp}(I_{exp})$ 520 to generate feature map $\beta_{exp}^k$ 524 and feature map $\gamma_{exp}^k$ 522.

The MC-AAD layer 530 uses the feature maps to feed the denormalized input tensor $\bar{h}^k$ 510 into multiple branches for identity feature tensor $z_{id}(I_{id})$ 514 and the expression feature tensor $z_{exp}(I_{exp})$ 520, respectively, for feature embedding. The MC-AAD layer 530 integrates the embedded features through attention-based fusion.

The MC-AAD layer 530 multiplies the denormalized input tensor $\bar{h}^k$ 510 by the feature map $\gamma_{att}^k$ 506 and adds the feature map $\beta_{att}^k$ 504 to the product to renormalize the denormalized input tensor $\bar{h}^k$ 510 and integrate the attribute feature tensor $z_{att}^k(I_{att})$ 502 (with dimensions $C_{att}^k \times H^k \times W^k$) as attribute feature $A^k$ using the following equation:

$$A^k = \gamma_{ALL}^k \times \bar{h}^k + \beta_{ALL}^k$$

where the feature map $\gamma_{Att}^k \in \mathbb{R}^{C^k \times H^k \times W^k}$ and the feature map $\beta_{att}^k \in \mathbb{R}^{C^k \times H^k \times W^k}$ are convolved from the attribute feature tensor $z_{att}^k$ 502 by convolutional layers. In this equation to generate the attribute feature $A^k$, the feature map $\gamma_{att}{}^k$ 506 estimates a mean value, while the feature map $\beta_{att}{}^k$ 504 estimates a standard deviation value.

The MC-AAD layer 530 multiplies the denormalized input tensor $\overline{h}^k$ 510 by the feature map $\gamma_{id}{}^k$ 516 and adds the feature map $\beta_{id}{}^k$ 518 to the product to renormalize the denormalized input tensor $\overline{h}^k$ 510 and integrate the identity feature tensor $z_{id}(I_{id})$ 514 (with dimensions $C_{id}{}^k \times 1 \times 1$) as identity feature $I^k$ using the following equation:

$$I^k = \gamma_{id}^k \times \overline{h}^k + \beta_{id}^k$$

Here, the feature map $\gamma_{id}{}^k \in \mathbb{R}^{C^k \times 1 \times 1}$ and $\beta_{id}{}^k \in \mathbb{R}^{C^k \times 1 \times 1}$ are computed from the identity feature tensor $z_{id}$ 514 using fully connected (FC) layers. In this equation to generate the identity feature $I^k$, the feature map $\gamma_{id}{}^k$ 516 estimates a mean value, while the feature map $\beta_{id}{}^k$ 506 estimates a standard deviation value.

The MC-AAD layer 530 multiplies the denormalized input tensor $\overline{h}^k$ 510 by the feature map $\gamma_{exp}{}^k$ 522 and adds the feature map $\beta_{exp}{}^k$ 524 to the product to renormalize the denormalized input tensor $\overline{h}^k$ 510 and integrate the expression feature tensor $z_{exp}(I_{exp})$ 520 (with dimensions $C_{exp}{}^k \times 1 \times 1$) as expression feature $E^k$ using the following equation:

$$E^k = \gamma_{exp}^k \times \overline{h}^k + \beta_{exp}^k$$

Here, the feature map $\gamma_{exp}{}^k \in \mathbb{R}^{C^k \times 1 \times 1}$ and $\beta_{exp}{}^k \in \mathbb{R}^{C^k \times 1 \times 1}$ are computed from the expression feature tensor $z_{exp}$ 520 using fully connected (FC) layers. In this equation to generate the expression feature $E^k$, the feature map $\gamma_{exp}{}^k$ 522 estimates a mean value, while the feature map $\beta_{exp}{}^k$ 524 estimates a standard deviation value.

The MC-AAD layer 530 can perform feature embedding for any number of adjusted attributes, with feature tensors $z_{x_i} \in$ $$\mathbb{R}^{C_{x_i}}$$

being integrated into the generator as feature $E_{x_i}{}^k$ using the following equation:

$$E_{x_i}^k = \gamma_{x_i}^k \times \overline{h}^k + \beta_{x_i}^k, \; x_i \in x = \{id, \exp, \dots \}$$

Here, $\gamma_{x_i}{}^k \in \mathbb{R}^{C^k \times 1 \times 1}$ and $\beta_{x_i}{}^k \in \mathbb{R}^{C^k \times 1 \times 1}$ are computed from $z_{x_i}$ through fully connected (FC) layers.

In some cases, the number of attributes to be adjusted, x, is greater than or equal to two, or $|x| \geq 2$. In such cases, the MC-AAD layer 530 generates $|x|+1$ attention masks $M_i{}^k$, where $i=0, 1, \dots, |x|$, for each of the embedded features. As illustrated in FIG. 5, the MC-AAD layer 530 generates a mask tensor $M^k$ 512, where $M^k \in \mathbb{R}^{(|x|+1) \times H^k \times W^k}$, based on the denormalized input tensor $h^k$ 510 using convolutional layer(s). Each slice of the mask tensor $M^k$ 512 along the channel dimension is $M_i{}^k$. The MC-AAD layer 530 can apply a softmax function is applied on all masks of the mask tensor $M^k$ 512, so that the sum of mask values at a position (h, w) across all channels is equal to one, as indicated in the equation below:

$$M_{i,(h,w)}^k = \frac{e^{M_{i,(h,w)}^k}}{\sum_{i=0}^{|x|} e^{M_{i,(h,w)}^k}}$$

In some cases, the number of attributes to be adjusted, x, is equal to one, or $|x|=1$. In such cases, the MC-AAD layer 530 generates the mask tensor $M^k$ 512 to have only one attention mask $M_0{}^k \in \mathbb{R}^{1 \times H^k \times W^k}$, based on the denormalized input tensor $\overline{h}^k$ 510 using convolution. The MC-AAD layer 530 applies a sigmoid function is applied to the result, to constrain pixel values to be within the range (0,1).

The MC-AAD layer 530 can fuse all of the features using the fusion equation 526 to generate the output tensor $h_{out}{}^k$ 528. In cases where the identity feature $I^k$ and the expression feature $E^k$ are generated based on the identity feature tensor $z_{id}(I_{id})$ 514 and/or the expression feature tensor $z_{exp}(I_{exp})$ 520, respectively, the fusion equation 526 can be expressed as follows:

$$h_{out}^k = M_1^k \times A^k + M_2^k \times I^k + M_3^k \times E^k$$

In cases where features $E_{x_i}{}^k$ are generated based on feature tensors $z_{x_i} \in$ $$\mathbb{R}^{C_{x_i}},$$

the fusion equation 526 can be expressed as follows:

$$h_{out}^k = M_0^k \times A^k + \sum_{\substack{x_i \in x \\ i=1,2,\dots,|x|}} M_i^k \times E_{x_i}^k$$

$$h_{out}^k = \begin{cases} M_0^k \times A^k + \displaystyle\sum_{\substack{x_i \in x \\ i=1,2,\dots,|x|}} M_i^k \times E_{x_i}^k, \; \text{if } |x| \geq 2 \\ M_0^k \times A^k + \left(1 - M_0^k\right) \times E_{x_1}^k, \; \text{if } |x| = 1 \end{cases}$$

The output tensor $h_{out}{}^k$ 528 can serve as the input tensor $h_{in}{}^{k+1}$ for the next MC-AAD layer after the MC-AAD layer 530. If k=n, the output tensor $h_{out}{}^k$ 528 can serve as the combined image Y 380.

Ultimately, the MC-AAD layer 530 adaptively adjusts the effective regions of attributes from the source image(s) to the combined image Y 380 so that these attributes can participate in synthesizing different parts of the face for the combined image Y 380.

Figure 6:
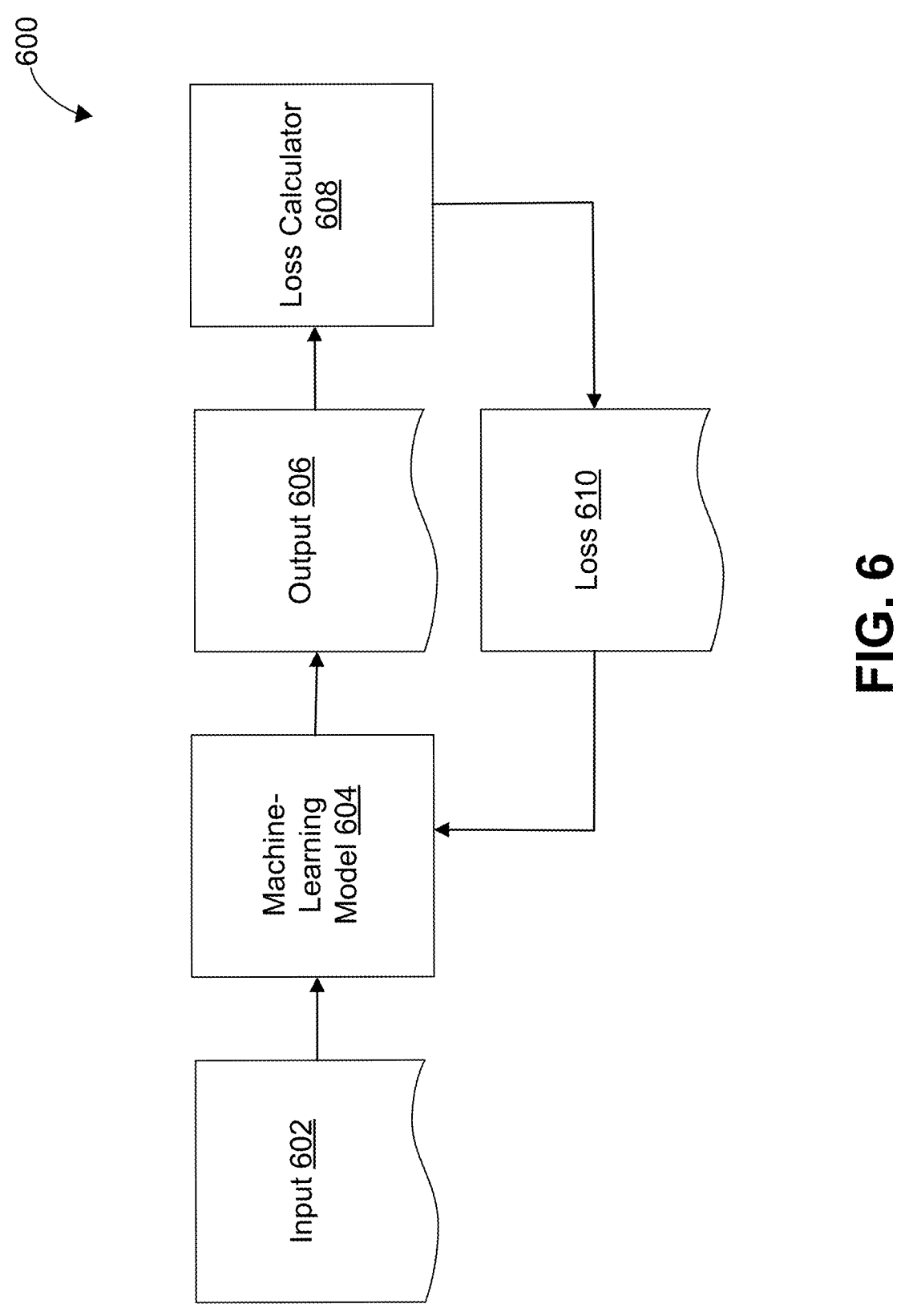
FIG. 6 is a block diagram illustrating a system for training a machine-learning model, according to various aspects of the present disclosure.

FIG. 6 is a block diagram illustrating a system 600 for training a machine-learning model 604, according to various aspects of the present disclosure. Machine-learning model 604 may be, or may include, any of machine-learning models of any of system 100 of FIG. 1, image modifier 102 of FIG. 1, system 200 of FIG. 2, attribute encoder 204 of FIG. 2, pose and gaze network 210 of FIG. 2, redirector 216 of FIG. 2, decoder 220 of FIG. 2, identity encoder 224 of FIG. 2, system 300 of FIG. 3, encoder 304 of FIG. 3, pose and gaze network 316 of FIG. 3, pose and gaze encoder 318 of FIG. 3, redirector 322 of FIG. 3, decoder 326 of FIG. 3, system 400 of FIG. 4, layer 430 of FIG. 4, the MC-AAD layer 530 of FIG. 5, MC-AAD layer 530 of FIG. 5, system 700 of FIG. 7, image modifier 702 of FIG. 7 and/or any other machine-learning models described herein.

System 600 may train machine-learning model 604 through a backpropagation process by providing input 602 to machine-learning model 604. Machine-learning model 604 may generate output 606 responsive to input 602. Loss calculator 608 may calculate a loss 610 representing a difference between output 606 and a desired output. Machine-learning model 604 may update weights or biases between nodes of machine-learning model 604 based on loss 610 to improve future output 606.

Loss calculator 608 may determine loss 610 using one or more techniques, which may include supervised learning techniques. Machine-learning model 604 may have a multi-level structure (which may be, or may include, a multi-level attribute encoder). Machine-learning model 604 may be implemented in a layer-wise fashion. Therefore, loss functions are notated in a layer-wise fashion by i, $i \in [0, N]$. The inputs are source image $I_s$ and target image $I_t$. Once trained, machine-learning model 604 can redirect the source image's head pose and gaze to a target head pose and target gaze, which is notated as $\widehat{I_{s \to t}}$.

System 600 may implement a reconstruction-loss technique. System 600 may guide the generation of redirected images with a pixel-wise L2 reconstruction loss between reconstructed image $\widehat{I_{t \to t}}$ (i.e., source and target images are both $I_t$) and target image $I_t$ given the estimated head pose and gaze from $I_t$:

$$\mathcal{L}_{rec}(\widehat{I_{t \to t}}, I_t) = \frac{1}{|I_t|} \|\widehat{I_{t \to t}} - I_t\|_2$$

Additionally, or alternatively, system 600 may implement a functional-loss technique. Functional loss prioritizes the minimization of task-relevant inconsistencies (e.g., mismatch in pupil locations) between generated and target images from the feature level.

$$\mathcal{L}_{feat}(\widehat{I_{s \to t}}, I_t) = \sum_{n=1}^{5} \frac{1}{|\psi_n(I_t)|} \|\psi_n(\widehat{I_{s \to t}}) - \psi_n(I_t)\|_2$$

where $\psi_n(\bullet)$ calculates the activation feature maps of the n-th layer of pretrained model F, i.e., a pretrained pose and gaze network 316 of FIG. 3, which is pretrained on gaze direction and the head orientation estimation. Additionally, a content-consistency loss which is formulated as the angular error between the predicted gaze direction and head orientation values from $\widehat{I_{s \to t}}$ and $I_t$ may be used. $F^g$ and $F^h$ are head pose and gaze directions estimated by pretrained model F.

$$\mathcal{L}_{cont}(\widehat{I_{s \to t}}, I_t) = \mathcal{E}_{ang}(F^g(\widehat{I_{s \to t}}), F^g(I_t)) + \mathcal{E}_{ang}(F^h(\widehat{I_{s \to t}}), F^h(I_t))$$

$$\mathcal{E}_{ang}(v, \hat{v}) = \arccos \frac{v \cdot \hat{v}}{\|v\| \cdot \|\hat{v}\|}$$

Additionally, or alternatively, system 600 may implement an explicit-label-loss technique. In the normalization and denormalization process, a corresponding label ĉ may be estimated from the features. Therefore, an estimation angular error may be used on the gaze direction and the head orientation labels.

$$\mathcal{L}_l = \mathcal{E}_{ang}(c^g, \widehat{c^g}) + \mathcal{E}_{ang}(c^h, \widehat{c^h})$$

Additionally, or alternatively, system 600 may implement an embedding-consistency-loss technique. The normalized embeddings, which no longer maintain any head poses or gazes information, should be consistent among different samples even though they are from multiple subjects. $\widehat{Z^N}$ represent normalized embedding of generated image $\widehat{I_{s \to t}}$.

$$\mathcal{L}_{EC} = 1 - \frac{Z^N \cdot \widehat{Z^N}}{\|Z^N\| \cdot \|\widehat{Z^N}\|}$$

Additionally, or alternatively, system 600 may implement a regularization-loss technique. The estimated residual vector which contains the new head pose and gaze directions would be added back to the original latent vector to achieve the redirection task. However, it may be undesirable for this offset to change the original latent vector too much, which is supervised by this regularization loss. $\hat{Z}_{att-i}$ represents decoded features of generated image $\widehat{I_{s \to t}}$.

$$\mathcal{L}_{reg} = \sum_{i=0}^{N} \|\hat{Z}_{att-i} - Z_{attr-i}\|_2$$

Additionally, or alternatively, system 600 may implement an adversarial-loss technique. A multi-scale discriminator is included to distinguish synthesized (fake) images from real face images in the training dataset. $I_t$ is defined as a classification loss (e.g., binary cross/entropy loss) between input image I and the corresponding label $\in$ {Real, Fake}.

$$\mathcal{L}_{adv}(I, label) = \text{Classification } (I, label)$$

In training the discriminator, the classification loss should be minimized $$\mathcal{L}_{DIS} = \mathcal{L}_{adv}(I_t, \text{Real}) + \mathcal{L}_{adv}(\widehat{I_{s \to t}}, \text{Fake})$$

where $I_t$ should be classified as a real image and $\widehat{I_{s \to t}}$ should be classified as fake. In training the network, $\mathcal{L}_{adv}$ is designed to maximize the classification error on the synthesized images, so that the network can generate images with realistic appearance.

According to some aspects, a loss in training the machine-learning model may be:

$$\mathcal{L}_{total} =$$

$$\lambda_{rec}\mathcal{L}_{rec} + \lambda_{feat}\mathcal{L}_{feat} + \lambda_{cont}\mathcal{L}_{cont} + \lambda_l\mathcal{L}_l + \lambda_{EC}\mathcal{L}_{EC} + \lambda_{reg}\mathcal{L}_{reg} + \mathcal{L}_{adv}\lambda_{adv}$$

where $\lambda_{rec}$, $\lambda_{feat}$, $\lambda_{cont}$, $\lambda_l$, $\lambda_{EC}$, $\lambda_{reg}$, and $\lambda_{adv}$ are coefficients of the reconstruction-loss technique, the functional-loss technique, the explicit-label-loss technique, embeddingconsistency-loss technique, the regularization-loss technique, and/or the adversarial-loss technique.

Figure 7:
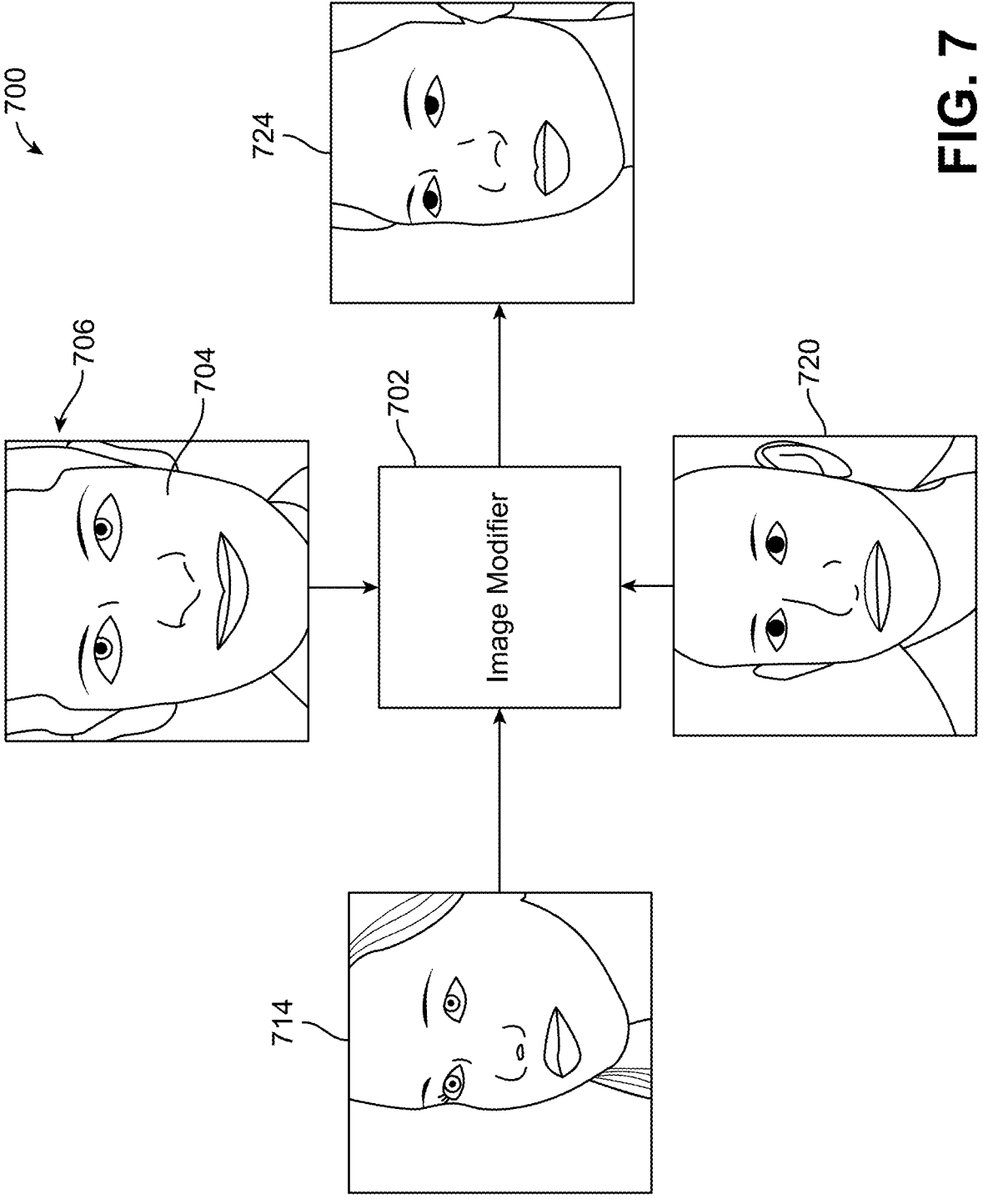
FIG. 7 is a block diagram illustrating yet another system for generating a modified image, according to various aspects of the present disclosure.

FIG. 7 is a block diagram illustrating a system 700 for generating a modified image 724, according to various aspects of the present disclosure. System 700 may include image modifier 702, which may obtain source image 706 of a face 704 of a person and generate modified image 724 of face 704 exhibiting a target gaze, a target head pose, and/or a target expression.

Source image 706 may represent face 704 of a person. Source image 706 (of face 704) may have source attributes. Source attributes may include, for example, shapes and/or colors of eyes, eyebrows, nose, nostrils, lips, chin, jaw, cheeks, forehead, ears, hair, facial hair, any combination thereof, and/or other portions of face 704 and/or of head. Additionally, or alternatively, source image 706 (or face 704) may have a source identity. The source identity of the source image 706 may include some, or all of, source attributes. Additionally, source identity may include additional aspects of source image 706 (or of face 704). Source identity may represent (e.g., implicitly) an identity of the person. Further, face 704 may exhibit a source head pose, a source gaze, and a source expression.

Image modifier 102 may obtain target head pose and/or target gaze. In some cases, image modifier 702 may receive target head pose and/or target gaze as respective pitch and yaw angles. In other cases, image modifier 702 may receive a target image 714 and extract target head pose and target gaze from target image 714. For example, image modifier 702 may include a machine-learning encoder (e.g., a multi-level attribute encoder) trained to determine target head pose and/or target gaze from an image (e.g., target image 714).

Additionally, or alternatively, image modifier 702 may obtain target expression. In some cases, image modifier 702 may receive target expression as a semantic label. In other cases, image modifier 702 may receive a target image 720 and extract target expression from target image 720. For example, image modifier 702 may include a machine-learning encoder (e.g., a multi-level attribute encoder) trained to determine target expression from an image (e.g., target image 720). Additionally, whether image modifier 702 received target expression as a label or extracted target expression from target image 720, image modifier 702 may determine an expression feature. For example, image modifier 702 may include a machine-learning model (e.g., a multi-level attribute encoder) that may encode the target expression into an expression feature (e.g., a feature vector implicitly representative of target expression).

Image modifier 702 may encode source image 706 (or face 704 of source image 706) into a plurality of features. Image modifier 702 may include a machine-learning model (e.g., a multi-level attribute encoder) that may encode the source image 706 into a number of source features (e.g., feature vectors). The source features may include attribute features (e.g., implicitly representative of source attributes), identity features (e.g., implicitly representative of source identity of the source image 706), a pose feature (e.g., implicitly representative of the source head pose of the source image 106), a gaze feature (e.g., implicitly representative of the source gaze of the source image 106), and/or an expression feature (e.g., implicitly representative of source expression of the source image 706). One or more of the source features may be based on a neural network (e.g., a convolutional neural network or a U-Net-based encoder) of the machine-learning model. For example, the source features may be outputs of one or more layers of the neural network.

Additionally, image modifier 702 may modify at least some of the source features based on target head pose and/or target gaze. For example, image modifier 702 may obtain (or determine) a pose-normalization matrix, a gaze-normalization matrix, a target-pose rotation matrix, and a target-gaze rotation matrix based on source head pose, source gaze, target head pose, and target gaze.

Image modifier 702 may apply the pose-normalization matrix to at least some of the source features of source image 706. For example, image modifier 702 may apply the pose-normalization matrix to the pose feature to generate a normalized pose feature. Further, image modifier 702 may apply the target-pose rotation matrix to the normalized pose feature to generate a rotated pose feature.

Additionally, image modifier 702 may apply the gaze-normalization matrix to at least some of the source features of source image 706. For example, image modifier 702 may apply the gaze-normalization matrix to the gaze feature to generate a normalized gaze feature. Further, image modifier 702 may apply the target-gaze rotation matrix to the normalized gaze feature to generate a rotated gaze feature.

Image modifier 702 may combine and/or decode the attribute features of the source features of source image 706, the identity features of the source features of source image 706, the rotated pose feature, the rotated gaze feature and/or the expression features to generate modified features. For example, image modifier 702 may combine and/or decode the source features, the rotated pose feature, and the rotated gaze feature using an invariant branch (e.g., invariant branch 404 of FIG. 4), a redirection branch (e.g., redirection branch 408 of FIG. 4) and a decoder (e.g., decoder 422 of FIG. 4) as describe with regard to FIG. 4. Additionally, or alternatively, image modifier 702 may combine and/or decode the identity features and/or the expression features in a similar fashion, (e.g., by using the identity features and/or the expression features into the invariant branch). Additionally, or alternatively, image modifier 702 may include the identity features (derived from source image 706) and/or the expression features (derived from target image 720 or otherwise received) with features (e.g., features 206 of FIG. 2 or features 308 of FIG. 3) that image modifier 702 uses to generate modified image 724. Additionally, or alternatively, image modifier 702 may use an identity encoder (e.g., identity encoder 224 of FIG. 2 or identity encoder 330 of FIG. 3) to include the identity features with features that target image 720 uses to generate modified image 724.

Image modifier 702 may generate modified image 724 using the modified features (including the source features, the identity feature, the expression feature, the rotated pose feature, and/or the rotated gaze feature. For example, image modifier 702 may generate modified image 724 using multi-channel adaptive attentional denormalization residual blocks based on the modified features.

Figure 8:
FIG. 8 is a flow diagram illustrating a process for redirecting a head pose and/or a gaze of a face in an image, in accordance with aspects of the present disclosure.
Figure 8:
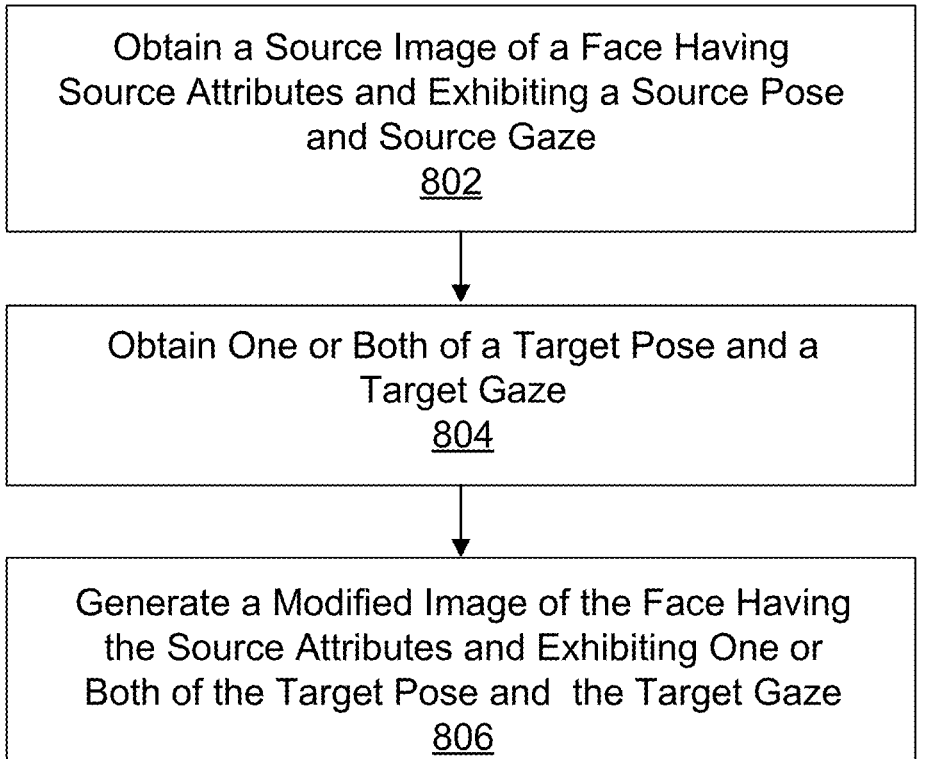

FIG. 8 is a flow diagram illustrating a process 800 for redirecting a head pose and/or a gaze of a face in an image, in accordance with aspects of the present disclosure. One or more operations of process 800 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The one or more operations of process 800 may be implemented as software components that are executed and run on one or more processors.

At block 802, a computing device (or one or more components thereof) may obtain a source image of a face having source attributes and exhibiting a source pose and source gaze.

For example, image modifier 102 of FIG. 1 may obtain source image 106 of FIG. 1 of face 104 of FIG. 1 having source attributes and exhibiting a source pose and a source gaze. As another example, system 200 of FIG. 2 may obtain source image 202 of FIG. 2 of a face having source attributes and exhibiting a source pose and a source gaze.

At block 804, the computing device (or one or more components thereof) may obtain at least one of a target pose and a target gaze. For example, image modifier 102 may obtain a target pose and/or a target gaze. As another example, system 200 may obtain target head pose 212 of FIG. 2 and/or target gaze 214 of FIG. 2.

In some aspects, the computing device (or one or more components thereof) may, to obtain the target pose and the target gaze (e.g., at block 804), extract the target pose and the target gaze from a target image using a machine-learning model. For example, pose and gaze network 316 may target head pose and gaze 320 from target image 314 using pose and gaze encoder 318.

In some aspects, at least one of the target pose and the target gaze may be directed toward a viewing angle from which the source image of the face is captured. In such aspects, the modified image may exhibit a head pose and/or gaze that is directed toward a viewing angle from which the image of the face is simulated to have been captured.

At block 806, the computing device (or one or more components thereof) may generate a modified image of the face having the source attributes and exhibiting at least one of the target pose and the target gaze. For example. Image modifier 102 may generate modified image 120 of FIG. 1 of face 104 having the source attributes and exhibiting the target pose and/or target gaze. As another example, system 200 may generate modified image 222 having source attributes and exhibiting target head pose 212 and/or target gaze 214.

In some aspects, the computing device (or one or more components thereof) may encode the source image (e.g., the image received at block 802) into a plurality of features using a machine-learning model and modify at least one feature of the plurality of features based on at least one of the target pose and the target gaze. The modified image of the face may be generated (e.g., at block 806) based on the plurality of features, including the modified at least one feature of the plurality of features. For example, encoder 304 may source image 302 into features 308 and outputs 310. Further, layer 430 may modify features at redirection branch 408, (e.g., to redirect a pose and/or gaze based on the target pose and target gaze. Decoder 326 may generate modified image 332 based on the features, including the modified features.

In some aspects, the source image may be encoded into the plurality of features using a convolutional neural network as an encoder. The plurality of features may be based on a plurality of layers of the convolutional neural network. The modified image may be generated using a deconvolutional network as a decoder. For example, encoder 304 may be, or may include a convolutional neural network that may be used to encode source image 302 into features 308 and outputs 310. Further, decoder 326 may be, or may include a deconvolutional network and may be used to generate modified image 332 based, at least in part on features 308 and outputs 310.

In some aspects, the computing device (or one or more components thereof) may encode the source image into a plurality of features, the plurality of features including attribute features representing the source attributes, a pose feature representing the source pose, and a gaze feature representing the source gaze. The computing device (or one or more components thereof) may at least one of: rotate the pose feature to match the target pose to generate a rotated pose feature or rotate the gaze feature to match the target gaze to generate a rotated gaze feature. The computing device (or one or more components thereof) may decode the attribute features and at least one of the rotated pose feature or the rotated gaze feature to generate modified features and generate the modified image based on the modified features. For example, encoder 304 may encode source image 302 into features 308 and outputs 310 which may include attribute features, a pose feature and a gaze feature. Layer 430 may rotate the pose feature and/or the gaze feature at redirection branch 408. Decoder 326 may decode the attribute features, including the rotated pose and/or rotated gaze feature to generate modified image 332.

In some aspects, the source image is encoded into the plurality of features using a multi-level attribute encoder; the plurality of features are based on a plurality of layers of the multi-level attribute encoder; and the modified image is generated using multi-channel adaptive attentional denormalization residual blocks based on the modified features. For example, encoder 304 may be, or may include a multi-level attribute encoder and may encode source image 302 into features 308 and outputs 310. Decoder 326 may be, or may include, multi-channel adaptive attentional denormalization residual blocks which may be used to decode the modified features to generate modified image 332.

In some examples, the methods described herein (e.g., process 800 and/or other methods described herein) can be performed by a computing device or apparatus. In one example, one or more of the methods can be performed, in whole or in part, by system 100 of FIG. 1, system 200 of FIG. 2, system 300 of FIG. 3, system 400 of FIG. 4, the MC-AAD layer 530 of FIG. 5, system 600 of FIG. 6, system 700 of FIG. 7, or one or more elements thereof. In another example, one or more of the methods can be performed by the computing-device architecture 1100 shown in FIG. 11. For instance, a computing device with the computing-device architecture 1100 shown in FIG. 11 can include the components of the system 100, system 200, system 300, system 400, the MC-AAD layer 530, system 600, system 700 and/or one or more elements thereof and can implement one or more of the operations of the process 800 of FIG. 8, and/or other process described herein.

The computing device can include any suitable device, such as a vehicle or a computing device of a vehicle, a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including process 800, and/or other process described herein. In some cases, the computing device or apparatus can include various components, such as one or more input devices, one or more output devices, one or more processors, one or more micro-processors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 800 and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 800, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 9:
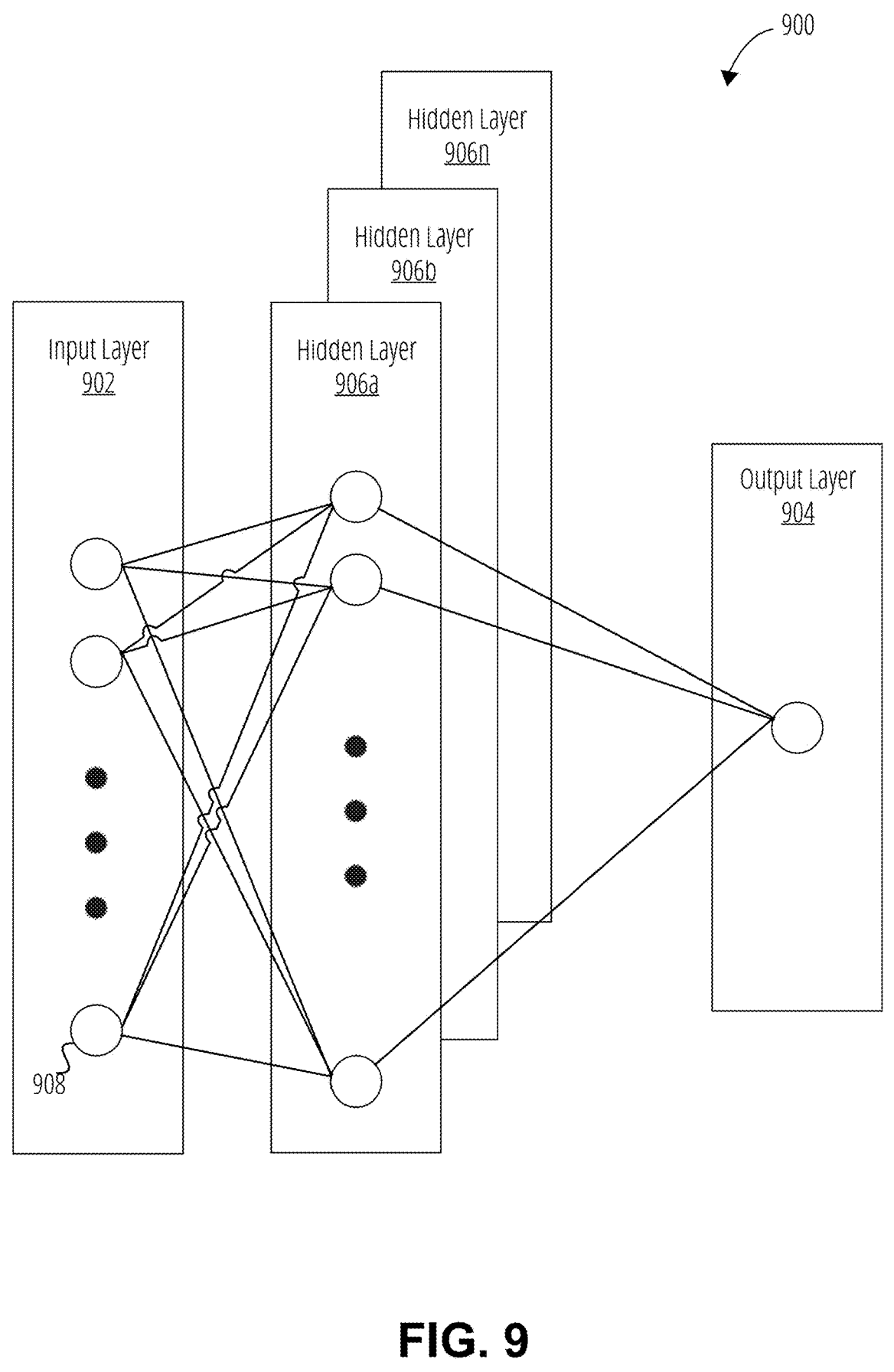

FIG. 9 is an illustrative example of a neural network 900 (e.g., a deep-learning neural network) that can be used to implement the machine-learning based feature segmentation, implicit-neural-representation generation, rendering, classification, encoding, and/or decoding described above. Neural network 900 may be an example of any of the machine-learning models described herein, including any of the machine-learning models of any of system 100 of FIG. 1, image modifier 102 of FIG. 1, system 200 of FIG. 2, attribute encoder 204 of FIG. 2, pose and gaze network 210 of FIG. 2, redirector 216 of FIG. 2, decoder 220 of FIG. 2, identity encoder 224 of FIG. 2, system 300 of FIG. 3, encoder 304 of FIG. 3, pose and gaze network 316 of FIG. 3, pose and gaze encoder 318 of FIG. 3, redirector 322 of FIG. 3, decoder 326 of FIG. 3, system 400 of FIG. 4, layer 430 of FIG. 4, the MC-AAD layer 530 of FIG. 5, MC-AAD layer 530 of FIG. 5, system 600 of FIG. 6, machine-learning model 604 of FIG. 6, system 700 of FIG. 7, image modifier 702 of FIG. 7.

An input layer 902 includes input data. In one illustrative example, input layer 902 can include data representing an image, as an example. Neural network 900 includes multiple hidden layers hidden layers 906a, 906b, through 906n. The hidden layers 906a, 906b, through hidden layer 906n include "n" number of hidden layers, where "n" is an integer greater than or equal to one. The number of hidden layers can be made to include as many layers as needed for the given application. Neural network 900 further includes an output layer 904 that provides an output resulting from the processing performed by the hidden layers 906a, 906b, through 906n. In one illustrative example, output layer 904 can provide features, as an example.

Neural network 900 can be, or can include, a multi-layer neural network of interconnected nodes. Each node can represent a piece of information. Information associated with the nodes is shared among the different layers and each layer retains information as information is processed. In some cases, neural network 900 can include a feed-forward network, in which case there are no feedback connections where outputs of the network are fed back into itself. In some cases, neural network 900 can include a recurrent neural network, which can have loops that allow information to be carried across nodes while reading in input.

Information can be exchanged between nodes through node-to-node interconnections between the various layers. Nodes of input layer 902 can activate a set of nodes in the first hidden layer 906a. For example, as shown, each of the input nodes of input layer 902 is connected to each of the nodes of the first hidden layer 906a. The nodes of first hidden layer 906a can transform the information of each input node by applying activation functions to the input node information. The information derived from the transformation can then be passed to and can activate the nodes of the next hidden layer 906b, which can perform their own designated functions. Example functions include convolutional, up-sampling, data transformation, and/or any other suitable functions. The output of the hidden layer 906b can then activate nodes of the next hidden layer, and so on. The output of the last hidden layer 906n can activate one or more nodes of the output layer 904, at which an output is provided. In some cases, while nodes (e.g., node 908) in neural network 900 are shown as having multiple output lines, a node has a single output and all lines shown as being output from a node represent the same output value.

In some cases, each node or interconnection between nodes can have a weight that is a set of parameters derived from the training of neural network 900. Once neural network 900 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 900 to be adaptive to inputs and able to learn as more and more data is processed.

Neural network 900 may be pre-trained to process the features from the data in the input layer 902 using the different hidden layers 906a, 906b, through 906n in order to provide the output through the output layer 904. In an example in which neural network 900 is used to identify features in images, neural network 900 can be trained using training data that includes both images and labels, as described above. For instance, training images can be input into the network, with each training image having a label indicating the features in the images (for the feature segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 900 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until neural network 900 is trained well enough so that the weights of the layers are accurately tuned.

For the example of identifying objects in images, the forward pass can include passing a training image through neural network 900. The weights are initially randomized before neural network 900 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 900, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 900 is unable to determine low-level features and thus cannot make an accurate determination of what the classification of the object might be. A loss function can be used to analyze error in the output. Any suitable loss function definition can be used, such as across-entropy loss Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 900 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

Neural network 900 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 900 can include any other deep network other than a CNN, such as an autoencoder, a deep belief nets (DBNs), a Recurrent Neural Networks (RNNs), among others.

Figure 10:
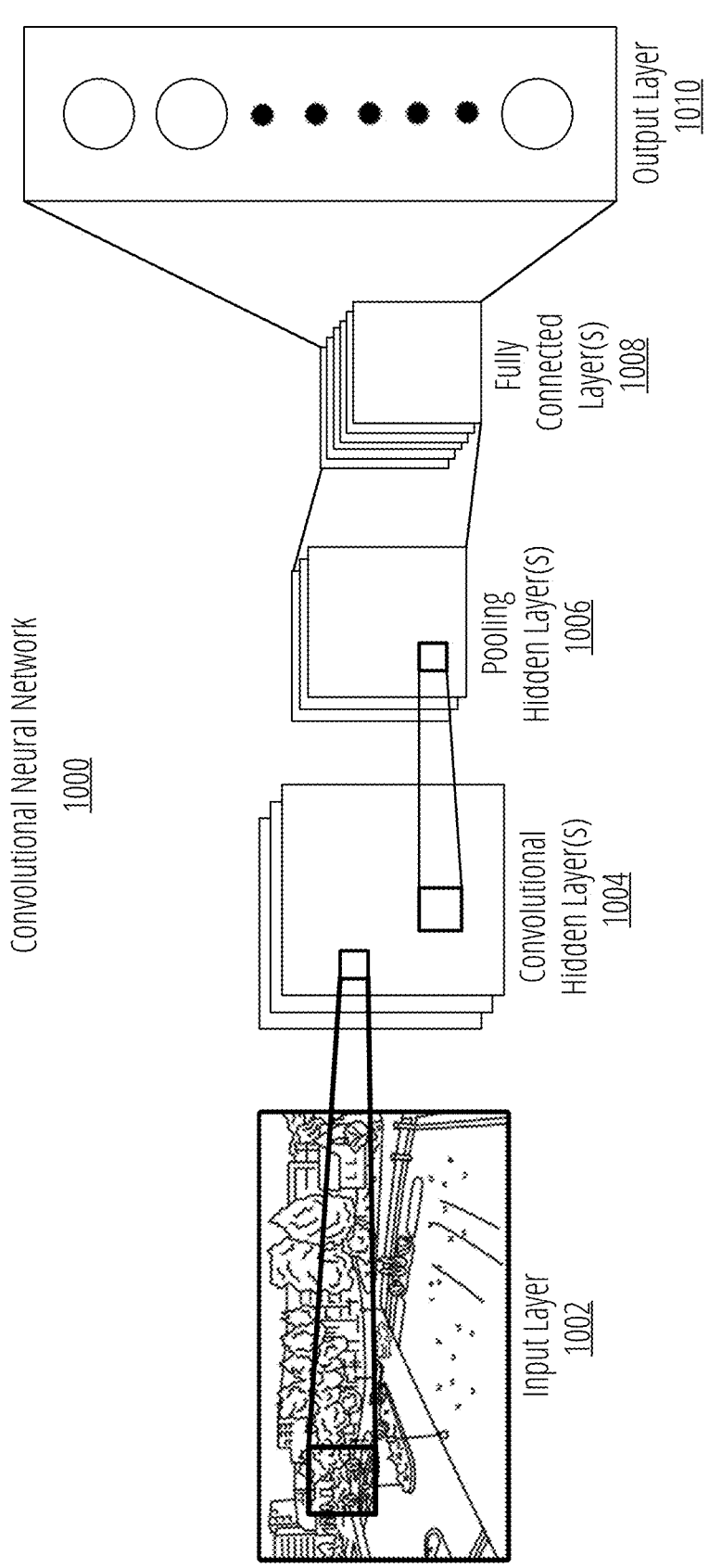
FIG. 10 is an illustrative example of a convolutional neural network (CNN), according to various aspects of the present disclosure.

FIG. 10 is an illustrative example of a convolutional neural network (CNN) 1000. The input layer 1002 of the CNN 1000 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1004, an optional non-linear activation layer, a pooling hidden layer 1006, and fully connected layer 1008 (which fully connected layer 1008 can be hidden) to get an output at the output layer 1010. While only one of each hidden layer is shown in FIG. 10, one of ordinary skill will appreciate that multiple convolutional hidden layers, non-linear layers, pooling hidden layers, and/or fully connected layers can be included in the CNN 1000. As previously described, the output can indicate a single class of an object or can include a probability of classes that best describe the object in the image.

The first layer of the CNN 1000 can be the convolutional hidden layer 1004. The convolutional hidden layer 1004 can analyze image data of the input layer 1002. Each node of the convolutional hidden layer 1004 is connected to a region of nodes (pixels) of the input image called a receptive field. The convolutional hidden layer 1004 can be considered as one or more filters (each filter corresponding to a different activation or feature map), with each convolutional iteration of a filter being a node or neuron of the convolutional hidden layer 1004. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1004. Each connection between a node and a receptive field for that node learns a weight and, in some cases, an overall bias such that each node learns to analyze its particular local receptive field in the input image. Each node of the convolutional hidden layer 1004 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1004 is due to each node of the convolutional layer being applied to its corresponding receptive field. For example, a filter of the convolutional hidden layer 1004 can begin in the top-left corner of the input image array and can convolve around the input image. As noted above, each convolutional iteration of the filter can be considered a node or neuron of the convolutional hidden layer 1004. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1004. For example, a filter can be moved by a step amount (referred to as a stride) to the next receptive field. The stride can be set to 1 or another suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1004.

The mapping from the input layer to the convolutional hidden layer 1004 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1004 can include several activation maps in order to identify multiple features in an image. The example shown in FIG. 10 includes three activation maps. Using three activation maps, the convolutional hidden layer 1004 can detect three different kinds of features, with each feature being detectable across the entire image.

In some examples, a non-linear hidden layer can be applied after the convolutional hidden layer 1004. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1000 without affecting the receptive fields of the convolutional hidden layer 1004.

The pooling hidden layer 1006 can be applied after the convolutional hidden layer 1004 (and after the non-linear hidden layer when used). The pooling hidden layer 1006 is used to simplify the information in the output from the convolutional hidden layer 1004. For example, the pooling hidden layer 1006 can take each activation map output from the convolutional hidden layer 1004 and generates a condensed activation map (or feature map) using a pooling function. Max-pooling is one example of a function performed by a pooling hidden layer. Other forms of pooling functions be used by the pooling hidden layer 1006, such as average pooling, L2-norm pooling, or other suitable pooling functions. A pooling function (e.g., a max-pooling filter, an L2-norm filter, or other suitable pooling filter) is applied to each activation map included in the convolutional hidden layer 1004. In the example shown in FIG. 10, three pooling filters are used for the three activation maps in the convolutional hidden layer 1004.

In some examples, max-pooling can be used by applying a max-pooling filter (e.g., having a size of 2×2) with a stride (e.g., equal to a dimension of the filter, such as a stride of 2) to an activation map output from the convolutional hidden layer 1004. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1004 having a dimension of 24×24 nodes, the output from the pooling hidden layer 1006 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1000.

The final layer of connections in the network is a fully-connected layer that connects every node from the pooling hidden layer 1006 to every one of the output nodes in the output layer 1010. Using the example above, the input layer includes 28×28 nodes encoding the pixel intensities of the input image, the convolutional hidden layer 1004 includes 3×24×24 hidden feature nodes based on application of a 5×5 local receptive field (for the filters) to three activation maps, and the pooling hidden layer 1006 includes a layer of 3 x12×12 hidden feature nodes based on application of max-pooling filter to 2×2 regions across each of the three feature maps. Extending this example, the output layer 1010 can include ten output nodes. In such an example, every node of the 3×12×12 pooling hidden layer 1006 is connected to every node of the output layer 1010.

The fully connected layer 1008 can obtain the output of the previous pooling hidden layer 1006 (which should represent the activation maps of high-level features) and determines the features that most correlate to a particular class. For example, the fully connected layer 1008 can determine the high-level features that most strongly correlate to a particular class and can include weights (nodes) for the high-level features. A product can be computed between the weights of the fully connected layer 1008 and the pooling hidden layer 1006 to obtain probabilities for the different classes. For example, if the CNN 1000 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1010 can include an M-dimensional vector (in the prior example, M=10). M indicates the number of classes that the CNN 1000 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 11:
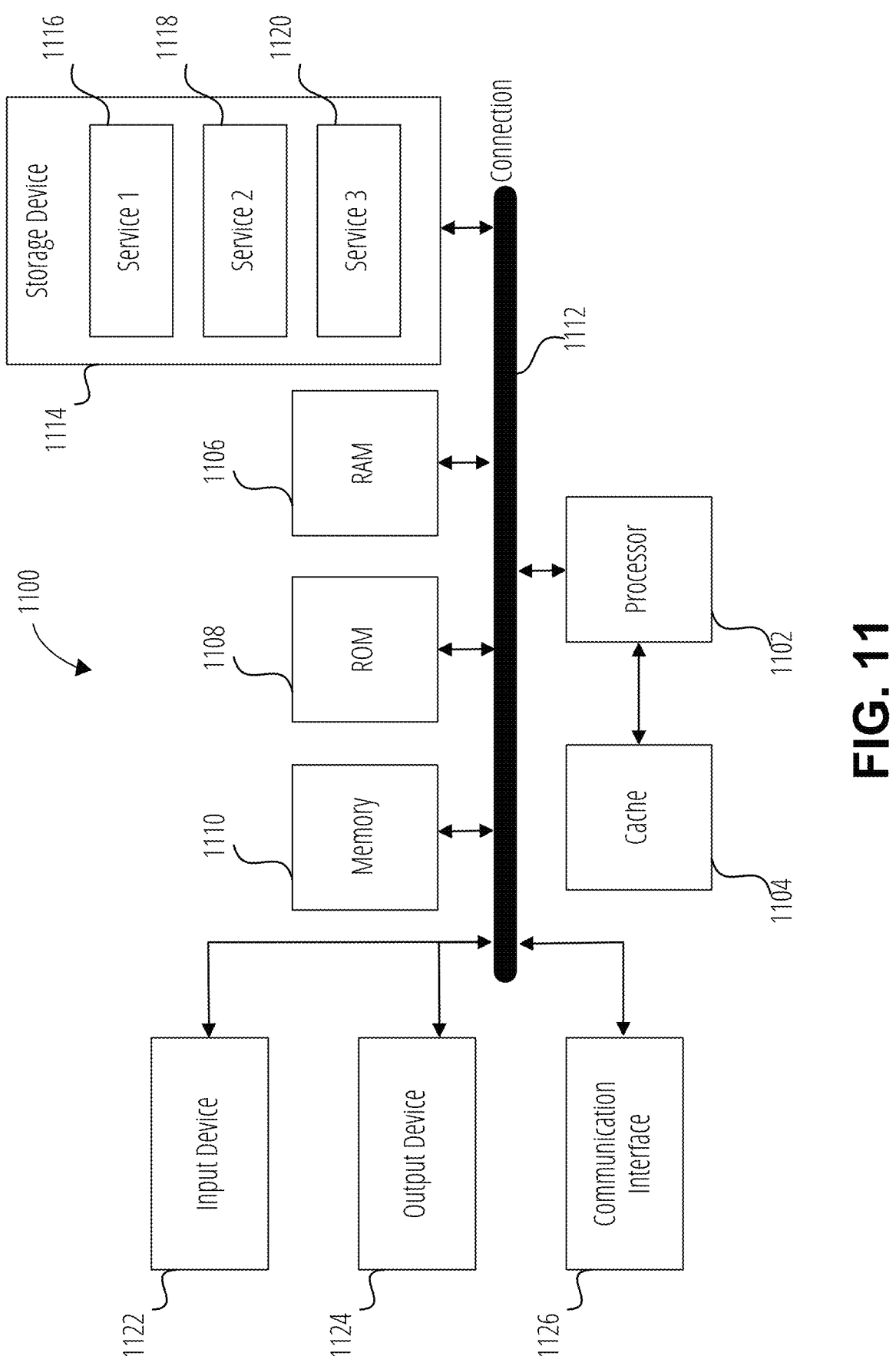
FIG. 11 illustrates an example computing-device architecture of an example computing device which can implement the various techniques described herein.

FIG. 11 illustrates an example computing-device architecture 1100 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing-device architecture 1100 are shown in electrical communication with each other using connection 1112, such as a bus. The example computing-device architecture 1100 includes a processing unit (CPU or processor) 1102 and computing device connection 1112 that couples various computing device components including computing device memory 1110, such as read only memory (ROM) 1108 and random-access memory (RAM) 1106, to processor 1102.

Computing-device architecture 1100 can include a cache of high-speed memory connected directly with, in close proximity to, or integrated as part of processor 1102. Computing-device architecture 1100 can copy data from memory 1110 and/or the storage device 1114 to cache 1104 for quick access by processor 1102. In this way, the cache can provide a performance boost that avoids processor 1102 delays while waiting for data. These and other modules can control or be configured to control processor 1102 to perform various actions. Other computing device memory 1110 may be available for use as well. Memory 1110 can include multiple different types of memory with different performance characteristics. Processor 1102 can include any general-purpose processor and a hardware or software service, such as service 1 1116, service 2 1118, and service 3 1120 stored in storage device 1114, configured to control processor 1102 as well as a special-purpose processor where software instructions are incorporated into the processor design. Processor 1102 may be a self-contained system, containing multiple cores or processors, a bus, memory controller, cache, etc. A multi-core processor may be symmetric or asymmetric.

To enable user interaction with the computing-device architecture 1100, input device 1122 can represent any number of input mechanisms, such as a microphone for speech, a touch-sensitive screen for gesture or graphical input, keyboard, mouse, motion input, speech and so forth.

Output device 1124 can also be one or more of a number of output mechanisms known to those of skill in the art, such as a display, projector, television, speaker device, etc. In some instances, multimodal computing devices can enable a user to provide multiple types of input to communicate with computing-device architecture 1100. Communication interface 1126 can generally govern and manage the user input and computing device output. There is no restriction on operating on any particular hardware arrangement and therefore the basic features here may easily be substituted for improved hardware or firmware arrangements as they are developed.

Storage device 1114 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1106, read only memory (ROM) 1108, and hybrids thereof. Storage device 1114 can include services 1116, 1118, and 1120 for controlling processor 1102. Other hardware or software modules are contemplated. Storage device 1114 can be connected to the computing device connection 1112. In one aspect, a hardware module that performs a particular function can include the software component stored in a computer-readable medium in connection with the necessary hardware components, such as processor 1102, connection 1112, output device 1124, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, optical disks, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for generating an image, the apparatus comprising: at least one memory; and at least one processor coupled to the at least one memory and configured to: obtain a source image of a face having source attributes and exhibiting a source pose and source gaze; obtain at least one of a target pose and a target gaze; and generate a modified image of the face having the source attributes and exhibiting at least one of the target pose and the target gaze.

Aspect 2. The apparatus of aspect 1, wherein the at least one processor is further configured to: encode the source image into a plurality of features using a machine-learning model; and modify at least one feature of the plurality of features based on at least one of the target pose and the target gaze; wherein the modified image of the face is generated based on the plurality of features, including the modified at least one feature of the plurality of features.

Aspect 3. The apparatus of any one of aspects 1 or 2, wherein: the source image is encoded into the plurality of features using a convolutional neural network as an encoder; the plurality of features are based on a plurality of layers of the convolutional neural network; and the modified image is generated using a deconvolutional network as a decoder.

Aspect 4. The apparatus of any one of aspects 1 to 3, wherein the at least one processor is further configured to: encode the source image into a plurality of features, the plurality of features including attribute features representing the source attributes, a pose feature representing the source pose, and a gaze feature representing the source gaze; at least one of rotate the pose feature to match the target pose to generate a rotated pose feature; or rotate the gaze feature to match the target gaze to generate a rotated gaze feature; decode the attribute features and at least one of the rotated pose feature or the rotated gaze feature to generate modified features; and generate the modified image based on the modified features.

Aspect 5. The apparatus of aspect 4, wherein: to rotate the pose feature the at least one processor is further configured to apply a pose-normalization matrix to the pose feature to generate a normalized pose feature and apply a target-pose rotation matrix to the normalized pose feature to generate the rotated pose feature; and to rotate the gaze feature the at least one processor is further configured to apply a gaze-normalization matrix to the gaze feature to generate a normalized gaze feature and apply a target-gaze rotation matrix to the normalized gaze feature to generate the rotated gaze feature.

Aspect 6. The apparatus of aspect 4, wherein: the source image is encoded into the plurality of features using a multi-level attribute encoder; the plurality of features are based on a plurality of layers of the multi-level attribute encoder; and the modified image is generated using multi-channel adaptive attentional denormalization residual blocks based on the modified features.

Aspect 7. The apparatus of any one of aspects 1 to 6, wherein to obtain the target pose and the target gaze the at least one processor is further configured to extract the target pose and the target gaze from a target image using a machine-learning model.

Aspect 8. The apparatus of any one of aspects 1 to 7, wherein at least one of the target pose and the target gaze are directed toward a viewing angle from which the source image of the face is captured.

Aspect 9. A method for generating an image, the method comprising: obtaining a source image of a face having source attributes and exhibiting a source pose and source gaze; obtaining at least one of a target pose and a target gaze; and generating a modified image of the face having the source attributes and exhibiting at least one of the target pose and the target gaze.

Aspect 10. The method of aspect 9, further comprising: encoding the source image into a plurality of features using a machine-learning model; and modifying at least one feature of the plurality of features based on at least one of the target pose and the target gaze; wherein the modified image of the face is generated based on the plurality of features, including the modified at least one feature of the plurality of features.

Aspect 11. The method of any one of aspects 9 or 10, wherein: the source image is encoded into the plurality of features using a convolutional neural network as an encoder; the plurality of features are based on a plurality of layers of the convolutional neural network; and the modified image is generated using a deconvolutional network as a decoder.

Aspect 12. The method of any one of aspects 9 to 11, further comprising: encoding the source image into a plurality of features, the plurality of features including attribute features representing the source attributes, a pose feature representing the source pose, and a gaze feature representing the source gaze; at least one of: rotating the pose feature to match the target pose to generate a rotated pose feature; or rotating the gaze feature to match the target gaze to generate a rotated gaze feature; decoding the attribute features and at least one of the rotated pose feature or the rotated gaze feature to generate modified features; and generating the modified image based on the modified features.

Aspect 13. The method of aspect 12, wherein: rotating the pose feature comprises applying a pose-normalization matrix to the pose feature to generate a normalized pose feature and applying a target-pose rotation matrix to the normalized pose feature to generate the rotated pose feature; and rotating the gaze feature comprises applying a gaze-normalization matrix to the gaze feature to generate a normalized gaze feature and applying a target-gaze rotation matrix to the normalized gaze feature to generate the rotated gaze feature.

Aspect 14. The method of aspect 12, wherein: the source image is encoded into the plurality of features using a multi-level attribute encoder; the plurality of features are based on a plurality of layers of the multi-level attribute encoder; and the modified image is generated using multi-channel adaptive attentional denormalization residual blocks based on the modified features.

Aspect 15. The method of any one of aspects 9 to 14, wherein obtaining the target pose and the target gaze comprises extracting the target pose and the target gaze from a target image using a machine-learning model.

Aspect 16. The method of any one of aspects 9 to 15, wherein at least one of the target pose and the target gaze are directed toward a viewing angle from which the source image of the face is captured.

Aspect 17. A non-transitory computer-readable storage medium having stored thereon instructions that, when executed by at least one processor, cause the at least one processor to perform operations according to any of aspects 9 to 16.

Aspect 18. An apparatus for providing virtual content for display, the apparatus comprising one or more means for perform operations according to any of aspects 9 to 16.

What is claimed is:

1. An apparatus for generating an image, the apparatus comprising:
   at least one memory; and
   at least one processor coupled to the at least one memory and configured to:
   obtain a source image of a face having source attributes and exhibiting a source pose and a source gaze;
   determine a pose-normalization matrix based on the source pose;
   determine a gaze-normalization matrix based on the source gaze;
   determine a plurality of source features based on the source image, wherein the plurality of source features include a pose feature and a gaze feature;
   apply the pose-normalization matrix to the pose feature to generate a normalized pose feature;
   apply the gaze-normalization matrix to the gaze feature to generate a normalized gaze feature;
   obtain a target pose;
   obtain a target gaze;
   determine a pose-rotation matrix based on the target pose;
   determine a gaze-rotation matrix based on the target gaze;
   apply the pose-rotation matrix to the normalized pose feature to generate a rotated pose feature;
   apply the gaze-rotation matrix to the normalized gaze feature to generate a rotated gaze feature; and
   generate a modified image of the face based on the plurality of source features the rotated pose feature, and the rotated gaze feature, wherein the modified image exhibits the source attributes, the target pose, and the target gaze.

2. The apparatus of claim 1, wherein, to determine the plurality of source features, the at least one processor is configured to encode the source image using a machine-learning model.

3. The apparatus of claim 2, wherein:
   the source image is encoded into the plurality of source features using a convolutional neural network as an encoder;
   the plurality of source features are based on a plurality of layers of the convolutional neural network; and
   the modified image is generated using a deconvolutional network as a decoder.

4. The apparatus of claim 1, wherein the plurality of source features include a plurality of attribute features, wherein, to generate the modified image of the face, the at least one processor is configured to decode the plurality of attribute features the rotated pose feature, and the rotated gaze feature to generate the modified image.

5. The apparatus of claim 4, wherein:
   the source image is encoded into the plurality of source features using a multi-level attribute encoder;
   the plurality of source features are based on a plurality of layers of the multi-level attribute encoder; and
   the at least one processor is configured to generate the modified image using multi-channel adaptive attentional denormalization residual blocks to process the plurality of attribute features, the rotated pose feature, and the rotated gaze feature to generate the modified image.

6. The apparatus of claim 1, wherein, to obtain the target pose and the target gaze, the at least one processor is further configured to extract the target pose and the target gaze from a target image using a machine-learning model.

7. The apparatus of claim 1, wherein at least one of the target pose or the target gaze is directed toward a viewing angle from which the source image of the face is captured.

8. A method for generating an image, the method comprising:

obtaining a source image of a face having source attributes and exhibiting a source pose and a source gaze;

determining a pose-normalization matrix based on the source pose;

determining a gaze-normalization matrix based on the source gaze;

determining a plurality of source features based on the source image, wherein the plurality of source features include a pose feature and a gaze feature;

applying the pose-normalization matrix to the pose feature to generate a normalized pose feature;

applying the gaze-normalization matrix to the gaze feature to generate a normalized gaze feature;

obtaining a target pose;

obtaining a target gaze;

determining a pose-rotation matrix based on the target pose;

determining a gaze-rotation matrix based on the target gaze;

applying the pose-rotation matrix to the normalized pose feature to generate a rotated pose feature;

applying the gaze-rotation matrix to the normalized gaze feature to generate a rotated gaze feature; and generating a modified image of the face based on the plurality of source features, the rotated pose feature, and the rotated gaze feature, wherein the modified image exhibits the source attributes, the target pose, and the target gaze.

9. The method of claim 8, wherein determining the plurality of source features comprises encoding the source image using a machine-learning model.

10. The method of claim 9, wherein:

the source image is encoded into the plurality of source features using a convolutional neural network as an encoder;

the plurality of source features are based on a plurality of layers of the convolutional neural network; and the modified image is generated using a deconvolutional network as a decoder.

11. The method of claim 8, wherein the plurality of source features include a plurality of attribute features, wherein generating the modified image of the face comprises decoding the plurality of attribute features, the rotated pose feature, and the rotated gaze feature to the modified image.

12. The method of claim 11, wherein:

the source image is encoded into the plurality of source features using a multi-level attribute encoder;

the plurality of source features are based on a plurality of layers of the multi-level attribute encoder; and the modified image is generated using multi-channel adaptive attentional denormalization residual blocks to process the plurality of attribute features, the rotated pose feature, and the rotated gaze feature to generate the modified image.

13. The method of claim 8, wherein obtaining the target pose and the target gaze comprises extracting the target pose and the target gaze from a target image using a machine-learning model.

14. The method of claim 8, wherein at least one of the target pose or the target gaze is directed toward a viewing angle from which the source image of the face is captured.

15. A non-transitory computer-readable storage medium having stored thereon instructions that, when executed by at least one processor, cause the at least one processor to:

obtain a source image of a face having source attributes and exhibiting a source pose and a source gaze;

determine a pose-normalization matrix based on the source pose;

determine a gaze-normalization matrix based on the source gaze;

determine a plurality of source features based on the source image, wherein the plurality of source features include a pose feature and a gaze feature;

apply the pose-normalization matrix to the pose feature to generate a normalized pose feature;

apply the gaze-normalization matrix to the gaze feature to generate a normalized gaze feature;

obtain a target pose;

obtain a target gaze;

determine a pose-rotation matrix based on the target pose;

determine a gaze-rotation matrix based on the target gaze;

apply the pose-rotation matrix to the normalized pose feature to generate a rotated pose feature;

apply the gaze-rotation matrix to the normalized gaze feature to generate a rotated gaze feature; and generate a modified image of the face based on the plurality of source features, the rotated pose feature, and the rotated gaze feature, wherein the modified image exhibits the source attributes and at least one of the target pose and the target gaze.

16. The non-transitory computer-readable storage medium of claim 15, wherein, to determine the plurality of source features, the instructions, when executed by the at least one processor, cause the at least one processor to encode the source image using a machine-learning model.

17. The non-transitory computer-readable storage medium of claim 16, wherein:

the source image is encoded into the plurality of source features using a convolutional neural network as an encoder;

the plurality of source features are based on a plurality of layers of the convolutional neural network; and the modified image is generated using a deconvolutional network as a decoder.

18. The non-transitory computer-readable storage medium of claim 15, wherein the plurality of source features include a plurality of attribute features, wherein, to generate the modified image of the face, the instructions, when executed by the at least one processor, cause the at least one processor to: decode the plurality of attribute features and at least one of the rotated pose feature or the rotated gaze feature to generate the modified image.

19. The non-transitory computer-readable storage medium of claim 18, wherein:

the source image is encoded into the plurality of source features using a multi-level attribute encoder;

the plurality of source features are based on a plurality of layers of the multi-level attribute encoder; and the modified image is generated using multi-channel adaptive attentional denormalization residual blocks to process the plurality of attribute features, the rotated pose feature, and the rotated gaze feature to generate the modified image.

20. The non-transitory computer-readable storage medium of claim 15, wherein to obtain the target pose and the target gaze the instructions, when executed by the at least one processor, cause the at least one processor to extract the target pose and the target gaze from a target image using a machine-learning model.

21. The non-transitory computer-readable storage medium of claim 15, wherein at least one of the target pose or the target gaze is directed toward a viewing angle from which the source image of the face is captured.

22. An apparatus for generating an image, the apparatus comprising:

means for obtaining a source image of a face having source attributes and exhibiting a source pose and a source gaze;

means for determining a pose-normalization matrix based on the source pose;

means for determining a gaze-normalization matrix based on the source gaze;

means for determining a plurality of source features based on the source image, wherein the plurality of source features include a pose feature and a gaze feature;

means for applying the pose-normalization matrix to the pose feature to generate a normalized pose feature;

means for applying the gaze-normalization matrix to the gaze feature to generate a normalized gaze feature;

means for obtaining a target pose;

means for obtaining a target gaze;

means for determining a pose-rotation matrix based on the target pose;

means for determining a gaze-rotation matrix based on the target gaze;

means for applying the pose-rotation matrix to the normalized pose feature to generate a rotated pose feature;

means for applying the gaze-rotation matrix to the normalized gaze feature to generate a rotated gaze feature; and means for generating a modified image of the face based on the plurality of source features, the rotated pose feature, and the rotated gaze feature, wherein the modified image exhibits the source attributes and at least one of the target pose and the target gaze.

23. The apparatus of claim 22, further comprising means for encoding the source image into the plurality of source features using a machine-learning model.

24. The apparatus of claim 23, wherein:

the source image is encoded into the plurality of source features using a convolutional neural network as an encoder;

the plurality of source features are based on a plurality of layers of the convolutional neural network; and the modified image is generated using a deconvolutional network as a decoder.

25. The apparatus of claim 22, wherein the plurality of source features include a plurality of attribute features, further comprising means for decoding the plurality of attribute features, the rotated pose feature, and the rotated gaze feature to generate modified features to generate the modified image.

26. The apparatus of claim 25, wherein:

the source image is encoded into the plurality of source features using a multi-level attribute encoder;

the plurality of source features are based on a plurality of layers of the multi-level attribute encoder; and the modified image is generated using multi-channel adaptive attentional denormalization residual blocks to process the plurality of attribute features, the rotated pose feature, and the rotated gaze feature to generate the modified image.

* * * * *